March 10, 1959  F. E. HAMILTON ET AL  2,877,450
DATA TRANSFER SYSTEM
Filed Dec. 21, 1953  21 Sheets-Sheet 3

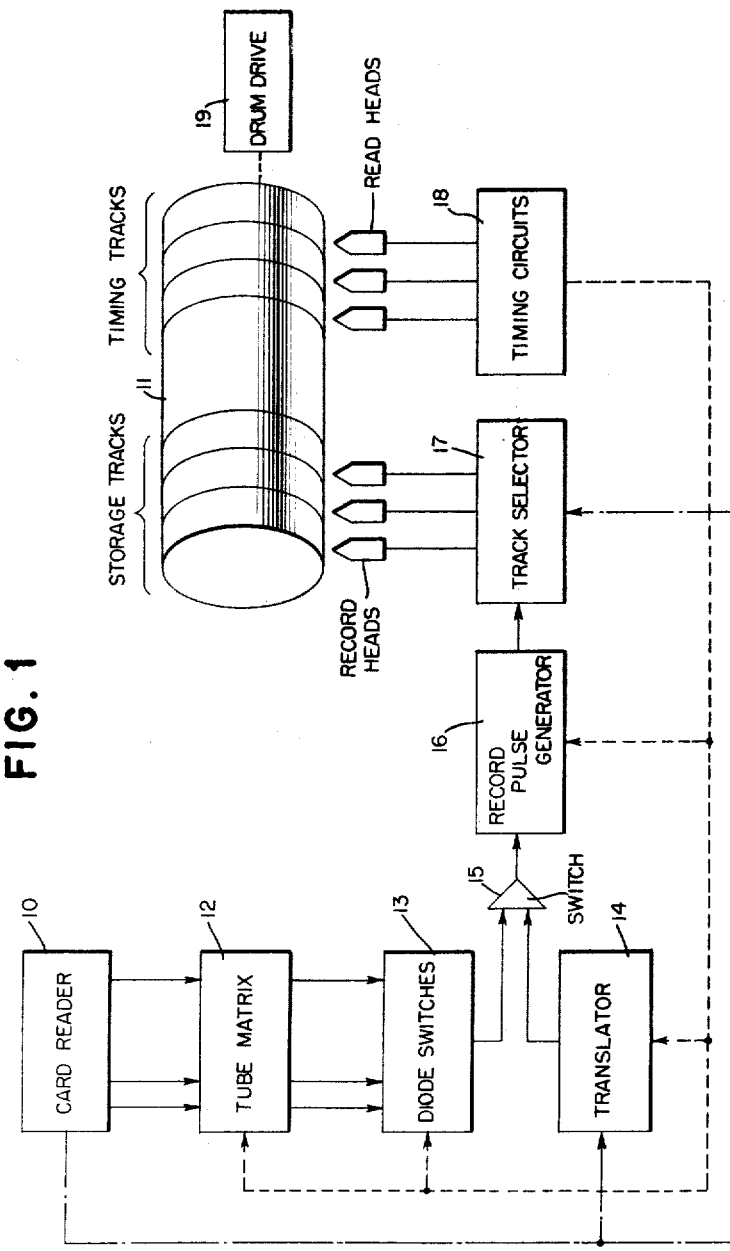

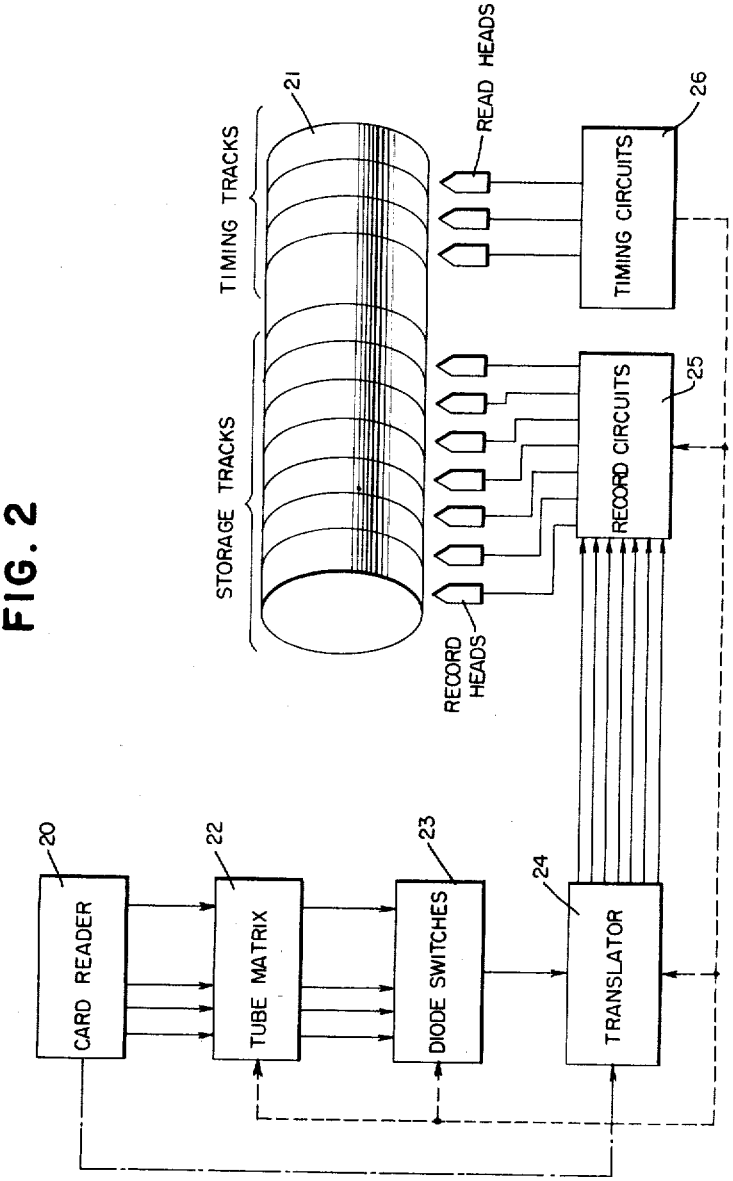

INVENTORS
FRANCIS E. HAMILTON
JAMES J. TROY
ERNEST S. HUGHES, Jr.
BY
Geoffrey Knight
ATTORNEY

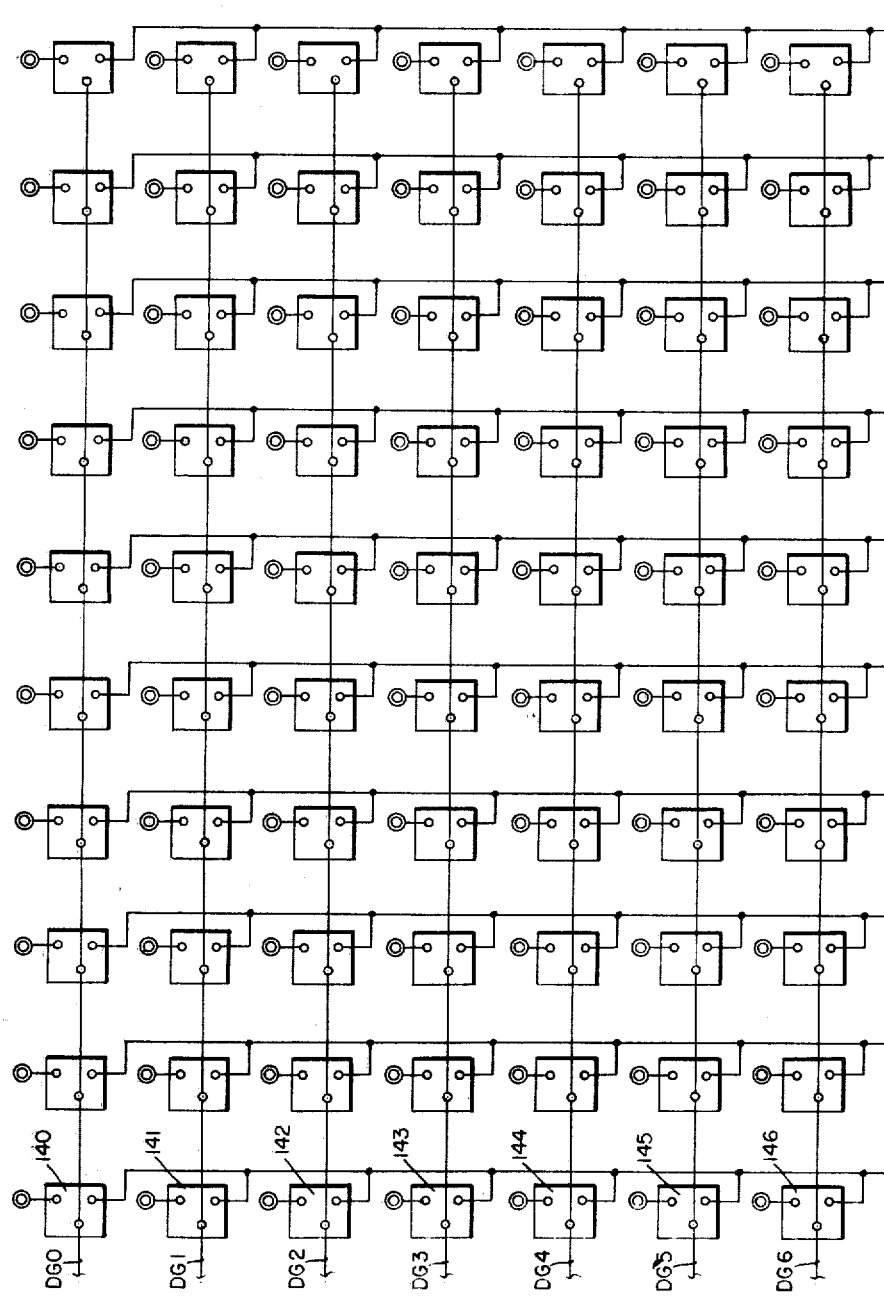

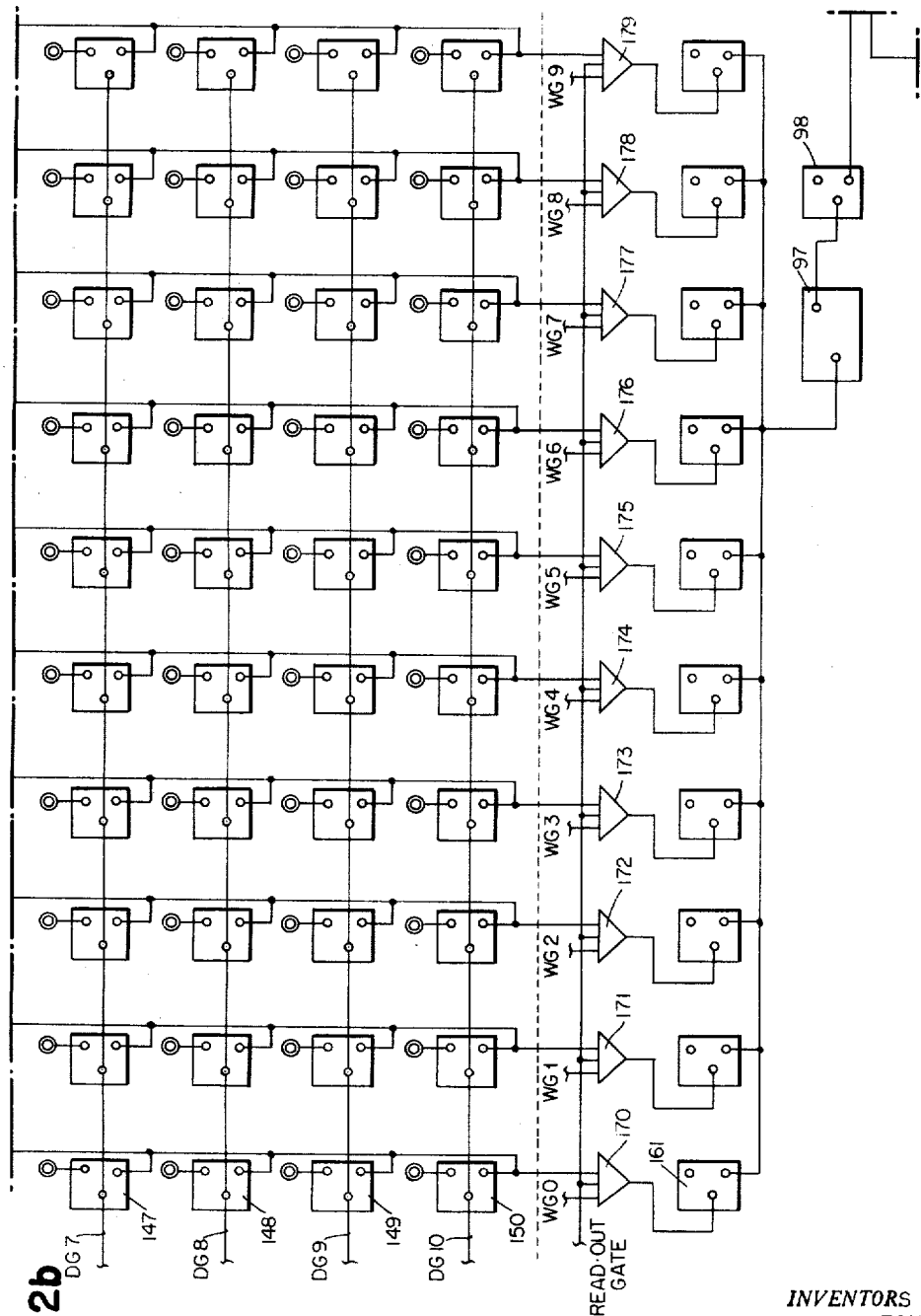

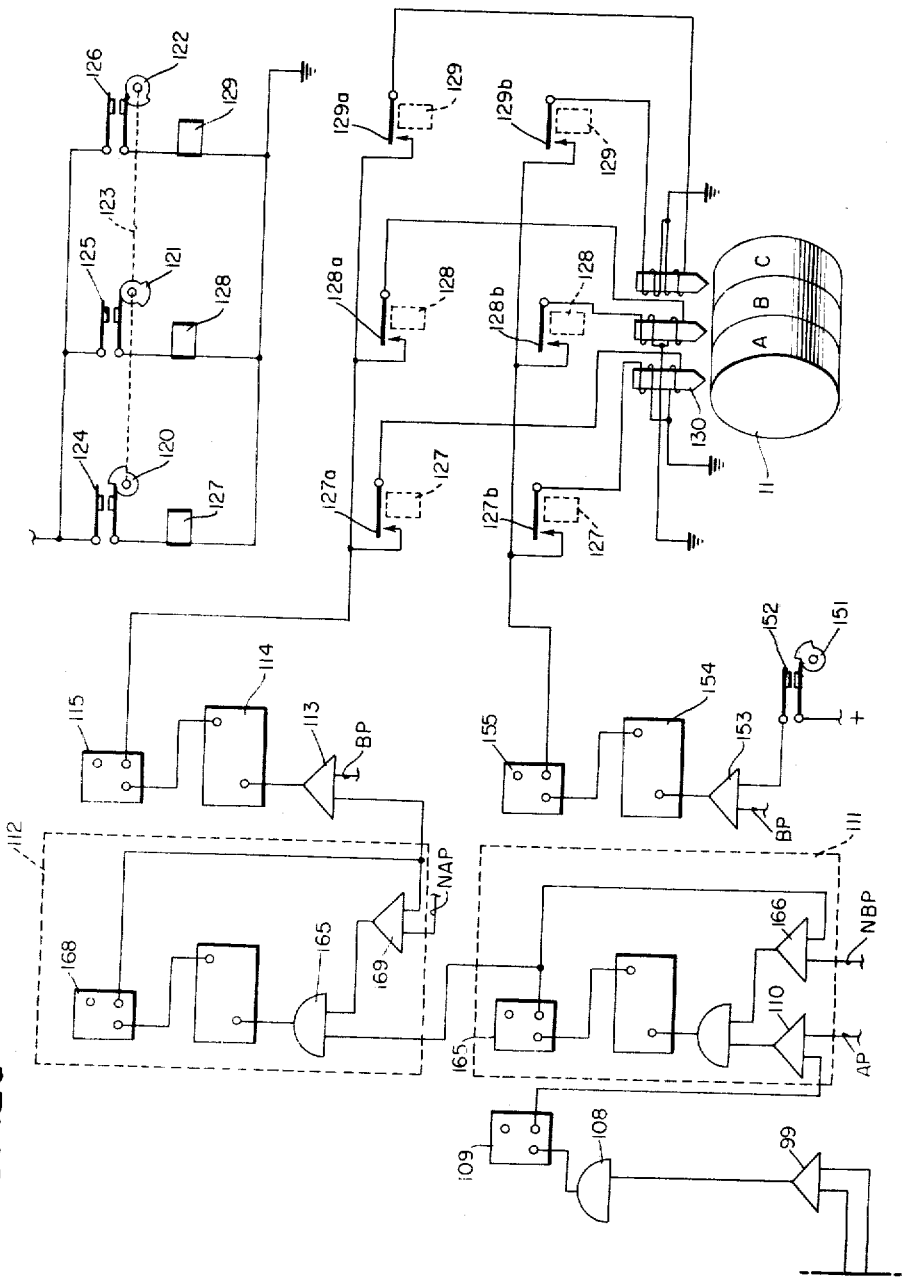

March 10, 1959  F. E. HAMILTON ET AL  2,877,450
DATA TRANSFER SYSTEM
Filed Dec. 21, 1953
21 Sheets-Sheet 14

INVENTORS
FRANCIS E. HAMILTON
JAMES J. TROY
ERNEST S. HUGHES, Jr.
BY Geoffrey Knight
ATTORNEY March 10, 1959    F. E. HAMILTON ET AL    2,877,450
DATA TRANSFER SYSTEM
Filed Dec. 21, 1953    21 Sheets-Sheet 15

*INVENTORS*
FRANCIS E. HAMILTON
JAMES J. TROY
ERNEST S. HUGHES, Jr.
BY Geoffrey Knight
ATTORNEY March 10, 1959  F. E. HAMILTON ET AL  2,877,450
DATA TRANSFER SYSTEM
Filed Dec. 21, 1953  21 Sheets-Sheet 16

INVENTORS
FRANCIS E. HAMILTON
JAMES J. TROY
ERNEST S. HUGHES, Jr.
BY Geoffrey Knight
ATTORNEY

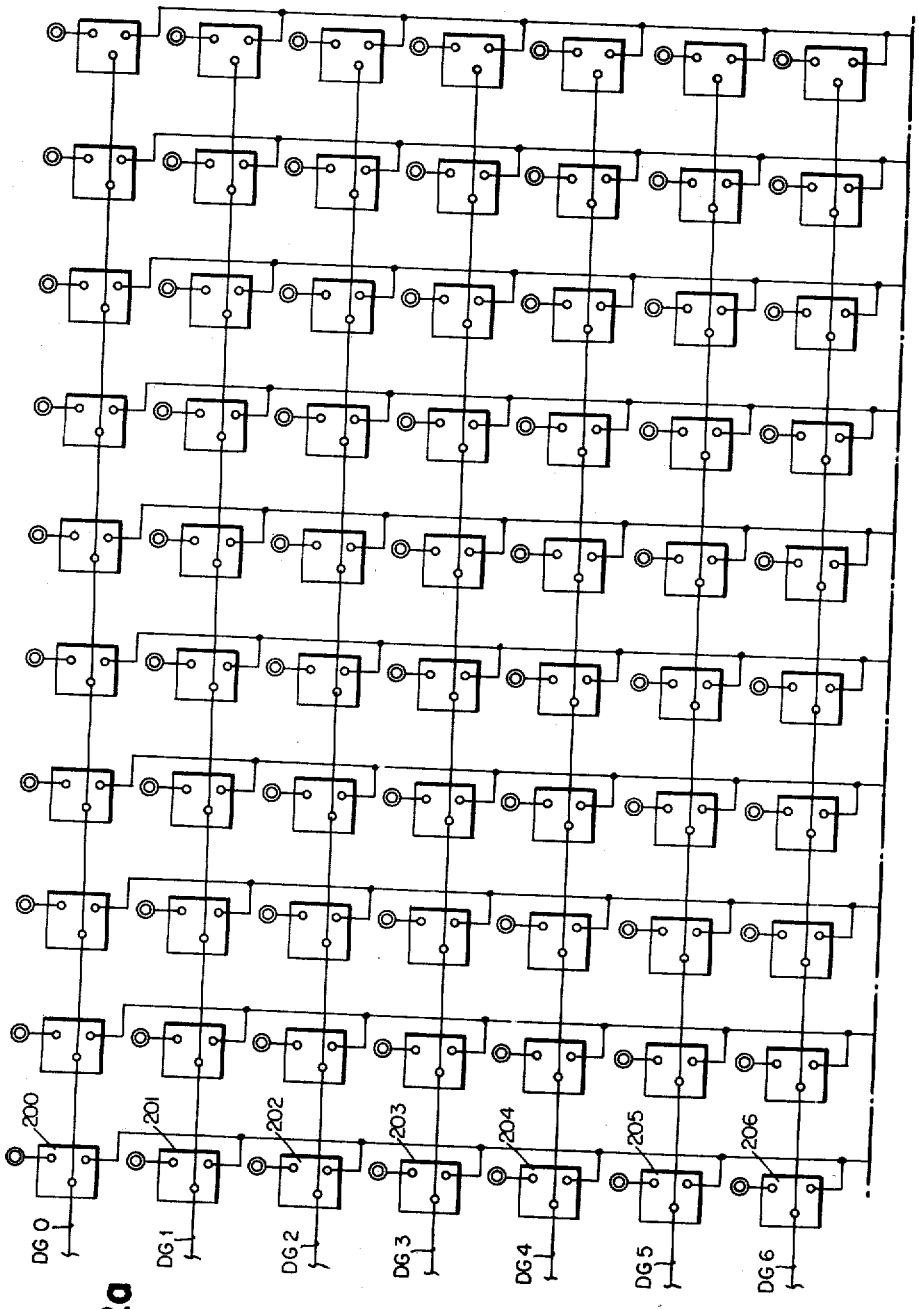

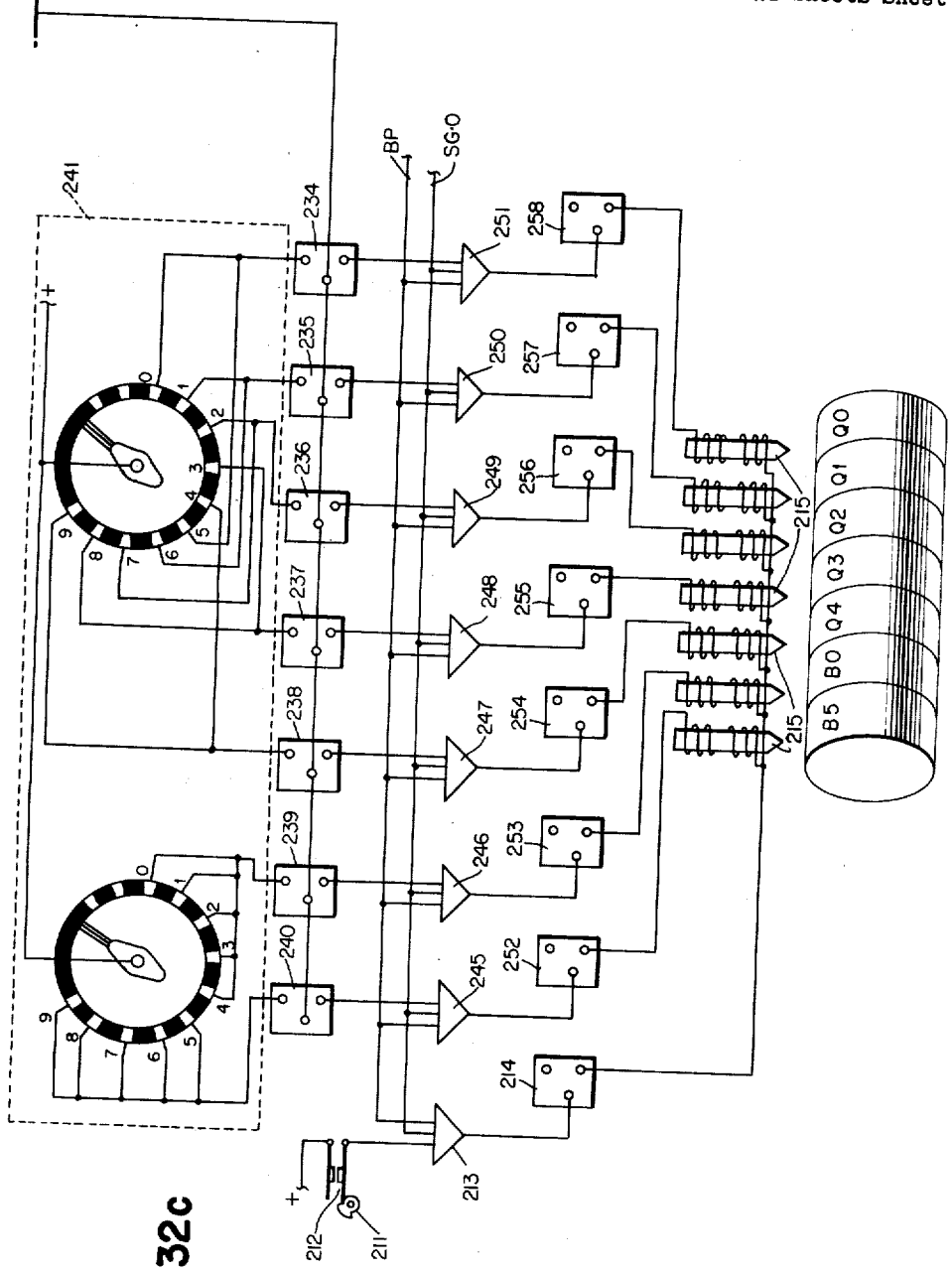

United States Patent Office 2,877,450
Patented Mar. 10, 1959

2,877,450
DATA TRANSFER SYSTEM

Francis E. Hamilton and James J. Troy, Binghamton, and Ernest S. Hughes, Jr., Vestal, N. Y., assignors to International Business Machines Corporation, New York, N. Y., a corporation of New York Application December 21, 1953, Serial No. 399,496

11 Claims. (Cl. 340—174)

This invention relates to data transfer apparatus, and more particularly to the data transfer and conversion controls for a magnetic storage device.

Many high-speed digital calculators utilize a rotating magnetic drum as the storage medium for information that is to be processed by the calculator. Storage devices of this type are characterized by large storage capacity and rapid access to the data stored therein. Prior to the processing operation it is necessary to introduce the data which is to be processed into the calculator. The employement of punched cards of the well-known IBM type as an input means to computing machines is well known. There is at the present time a need for a practical form of data conversion apparatus which will enable data from record cards to be entered into magnetic storage means.

Accordingly, the broad object of this invention is to provide improved means for introducing data from storage means, such as a record card, to the surface of a magnetic storage medium.

Another object of this invention is to provide an improved form of recording apparatus which functions to record data according to a predetermined pattern.

Another object of this invention is to provide apparatus for translating data according to one configuration into a different configuration for magnetic recording purposes.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a simplified schematic view of a data transfer system which employs a magnetic drum storage unit in accordance with the principles of the invention.

Fig. 2 is a simplified schematic view of a data transfer system in modified form, which employs a magnetic drum storage unit (Method 2).

Figs. 12a, 12b, 12c and 12d constitute a block diagram of the circuits for one embodiment of the data transfer system.

Figure 12C:
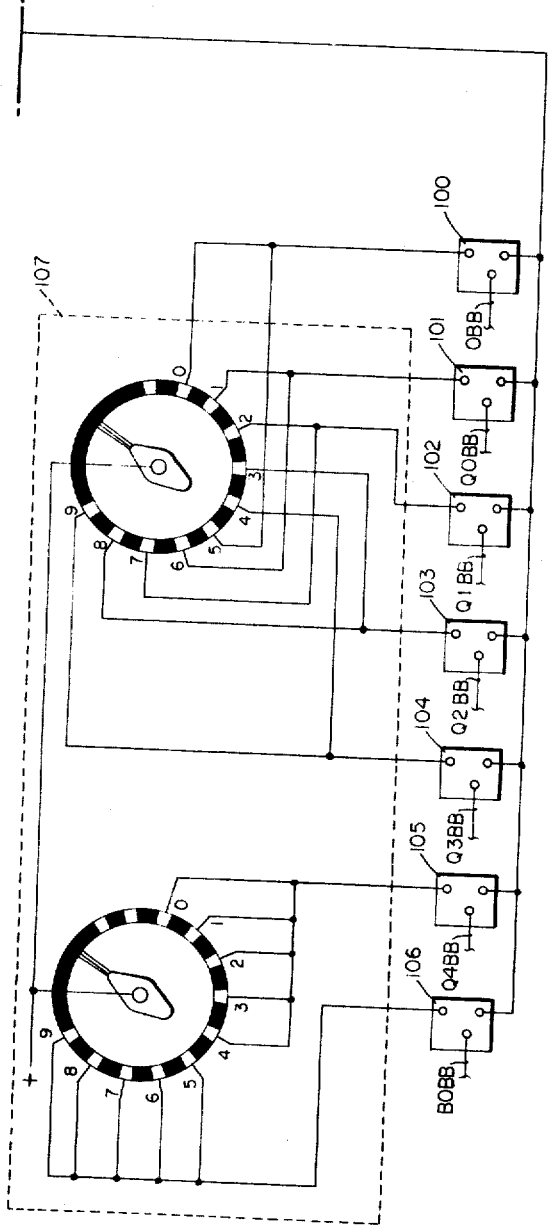
Figure 13:
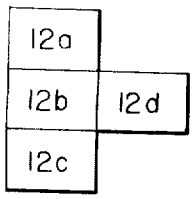

Fig. 13 is a diagram showing the manner in which Figs. 12a, 12b, 12c and 12d should be joined together.

Figs. 14 through 17 are schematic representations of circuit elements which are shown in block diagrams of the circuits.

Figure 18:
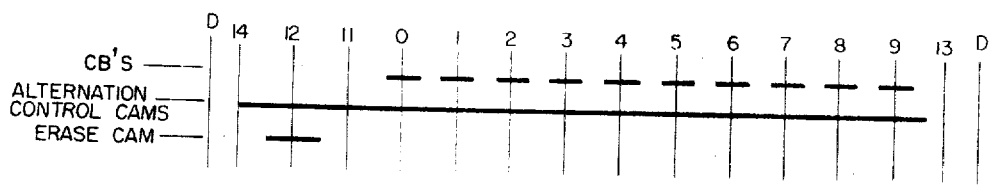

Fig. 18 is a timing chart for the card reader controlled cam contacts and sensing brushes.

Figs. 19 through 24 are schematic representations of circuit elements which are shown in the block diagrams of the circuits.

Figure 25:
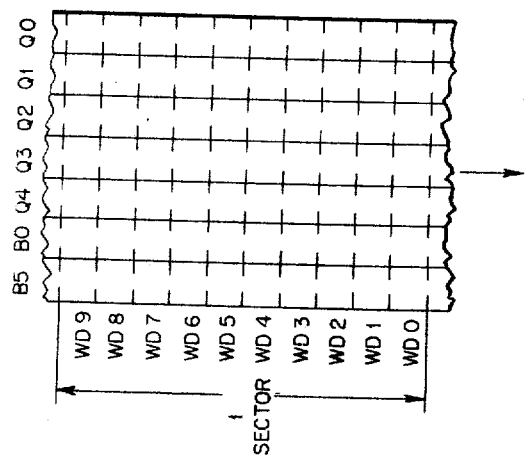

Fig. 25 is a fragmentary schematic representation of a band of storage tracks showing the arrangement of the code element tracks and the word positions (Method 2).

Figure 26:
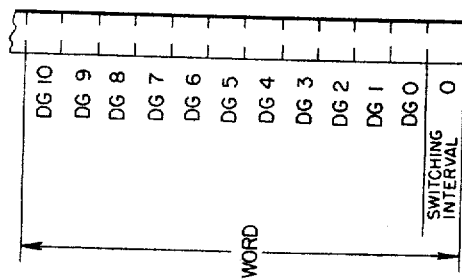

Fig. 26 is a fragmentary schematic representation of a storage track showing the arrangement of word positions (Method 2).

Figure 27:
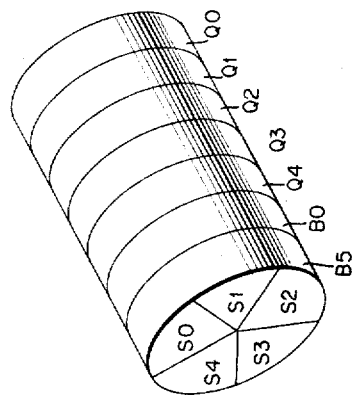

Fig. 27 is a schematic representation of a band of storage tracks showing the arrangement of the code element tracks and the layout of the storage sectors (Method 2).

Figure 28:
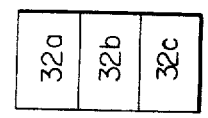
Figure 32B:
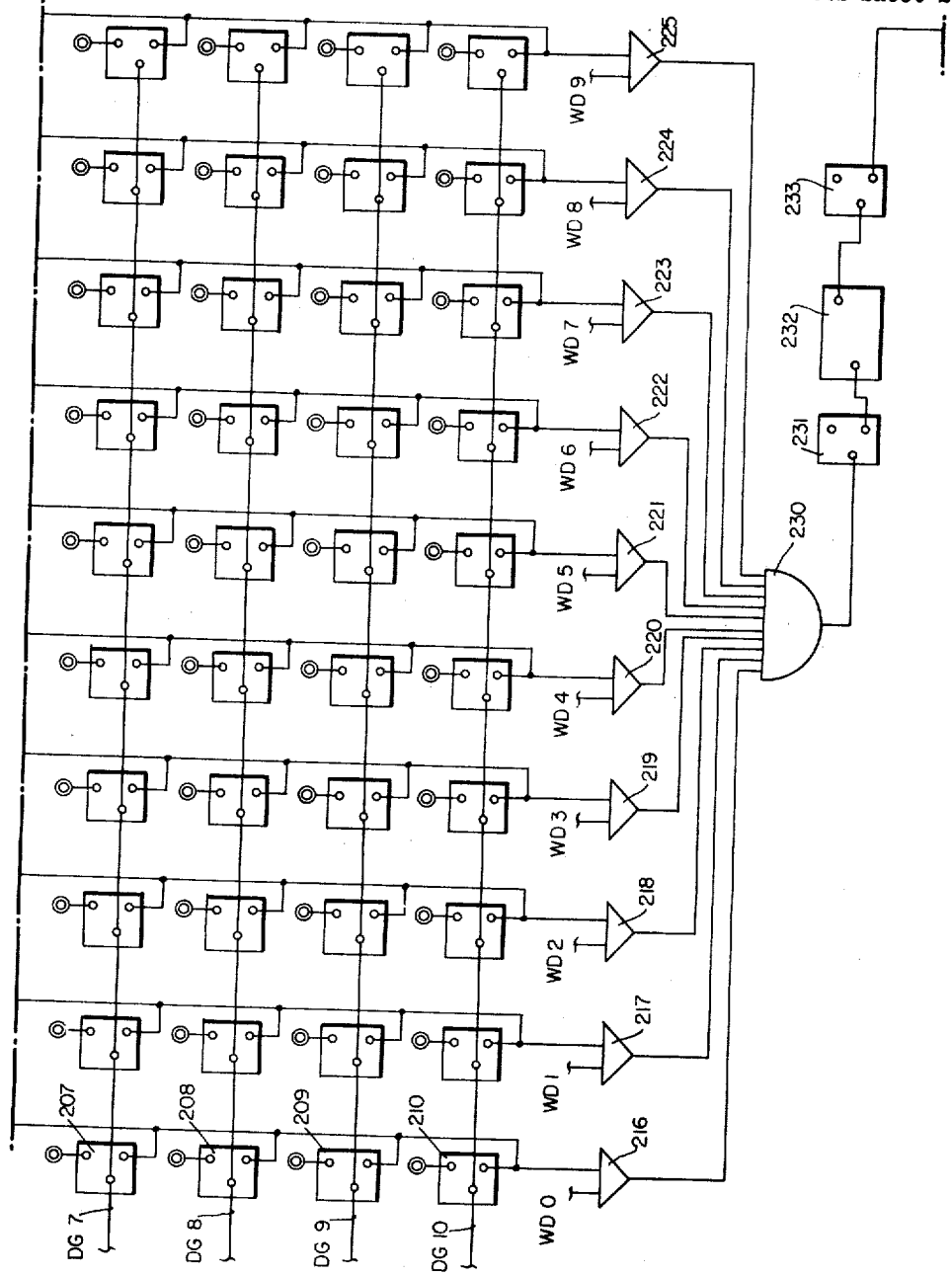

Fig. 28 is a diagram showing the manner in which Figs. 32a, 32b and 32c should be joined together (Method 2).

Figure 29:
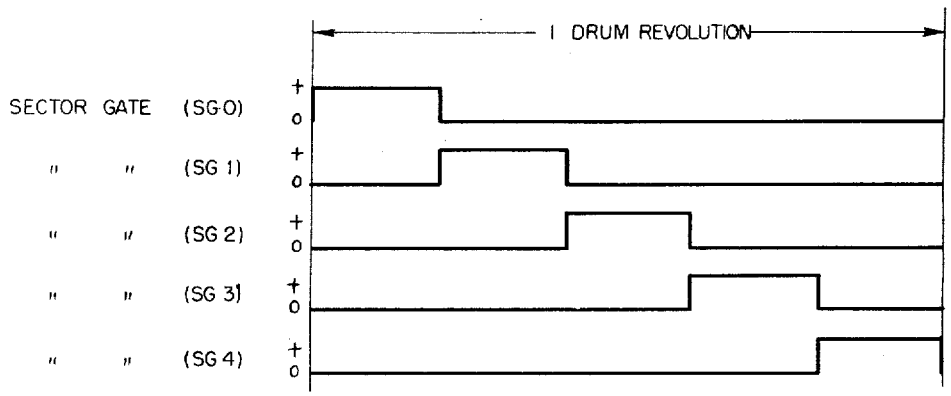
Figure 30:
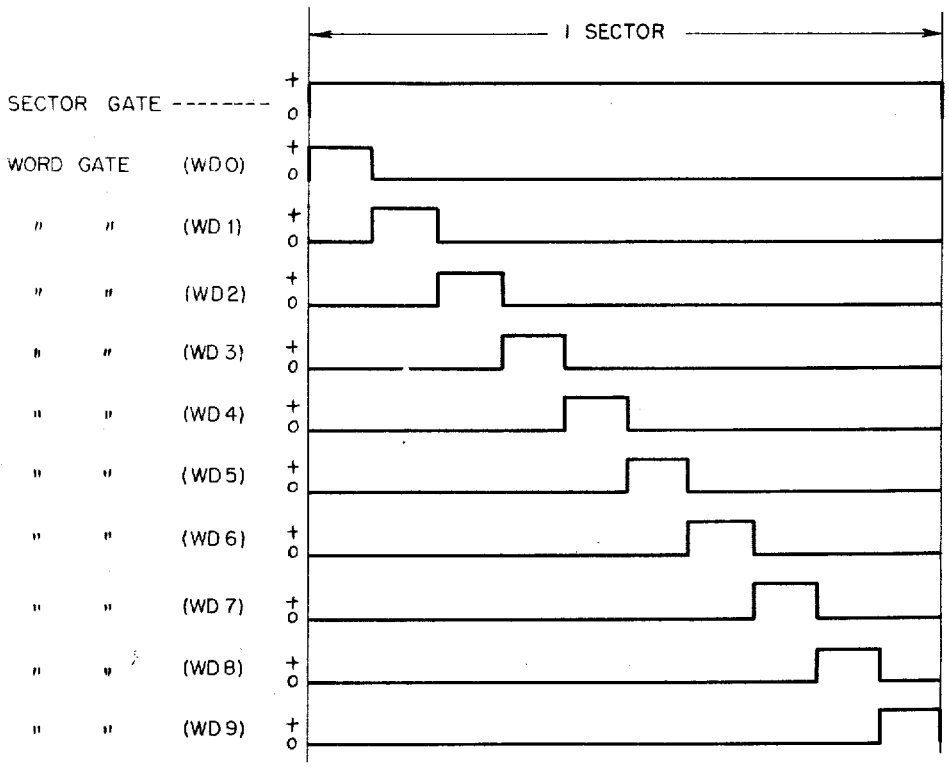
Figure 31:
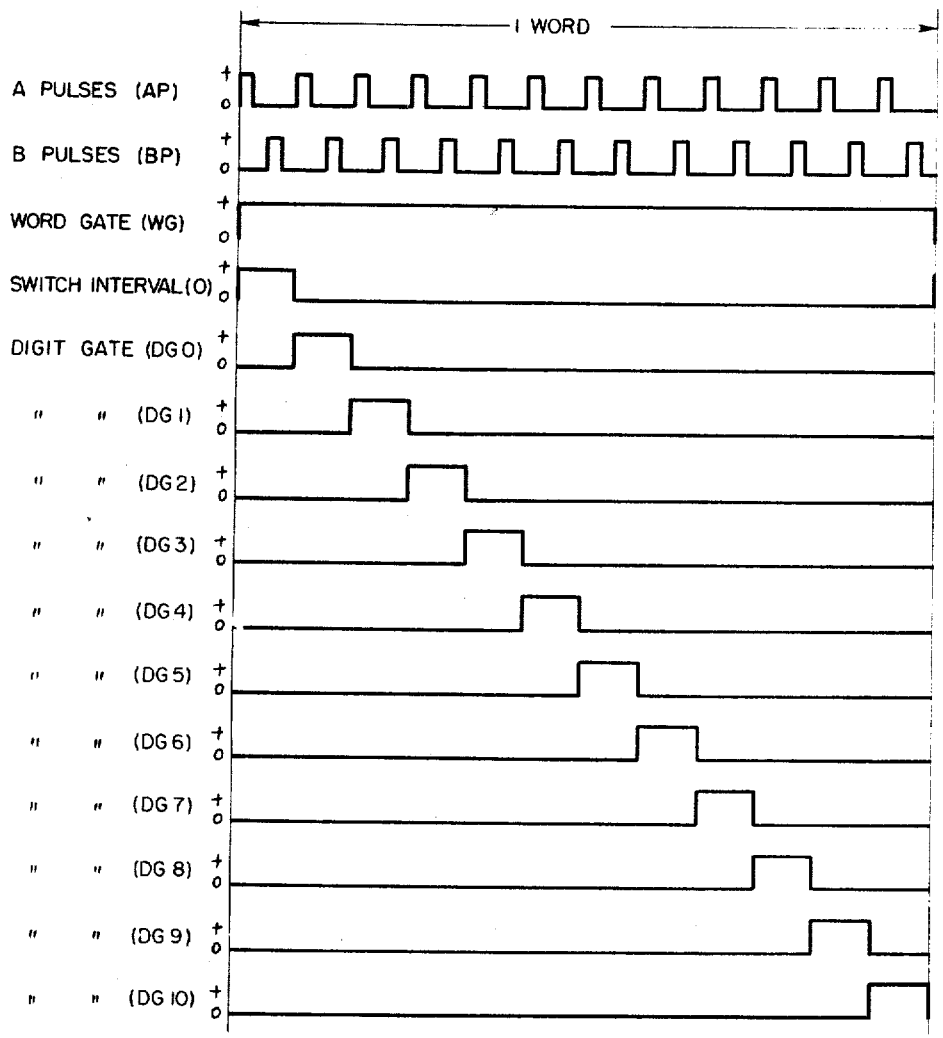

Figs. 29, 30 and 31 are timing diagrams showing the various timing pulses used in the data transfer system (Method 2).

Figs. 32a, 32b and 32c constitute a block diagram of the circuits for the data transfer system of Method 2.

General description

The instant invention concerns the transfer of data from static storage means, such as a record card, to a cyclically moving magnetic storage device, such as a magnetic drum. In the static storage means the data is represented by designations in columns and rows, the different columns being assigned to different character denominations, and the row position of the designations identifying the character. The transfer involves the reconciliation of this arrangement of the data designations in order to provide a sequential arrangement of the character recordings on the magnetic storage device.

The reconciliation is accomplished by assigning a different revolution of the magnetic storage device to each different kind of character. The data is recorded on the magnetic storage device as it is read out of the static storage means. During any one revolution of the magnetic storage device, all like-characters are read out in a sequence determined by the columnar position of the characters in the static storage means. The transfer of data during successive revolutions of the magnetic storage device involves the interspersion of the magnetic recordings during the successive cycles of the magnetic storage device.

Two preferred embodiments for introducing data into a magnetic storage device, namely, a serial-by-bit and serial-by-digit method, to be referred to hereinafter as Method 1, and a parallel-by-bit and serial-by-digit method to be referred to hereinafter as Method 2, will be described in detail.

In Fig. 1, there is shown schematically the data transfer apparatus for the serial-by-bit and serial-by-digit method (Method 1). The apparatus as shown comprises a card reader 10 for sensing the record medium, such as a record card; a magnetic drum storage device 11 for storing data sensed in the card reader 10; a tube matrix 12 and diode switches 13 controlled by the timing pulses generated by the timing portion of the magnetic drum storage device 11 for sequencing the data sensed in the card reader 10; a translator 14 controlled jointly by the card reader and timing pulses from the magnetic drum storage device 11 for translating data sensed in the card reader into coded form; a switch 15 for controlling the coded data; a pulse generator 16 for precisely timing and shaping data representative pulses; a track selector 17 controlled by the card reader 10 for determining the particular track of the magnetic storage device on which data is to be stored; timing circuits 18 controlled by magnetically recorded timing spots located on the timing portion of the drum.

In Fig. 2 there is shown schematically the data transfer apparatus for the parallel-by-bit and serial-by-digit method (Method 2) of introducing data into magnetic drum storage. The apparatus as shown comprises a card reader 20 for sensing the record card, a magnetic drum storage device 21 for storing data sensed in the card reader 20, a tube matrix 22 and diode switches 23 for sequencing data sensed in the card reader 20, a translator 24 for converting the sensed data into coded form, record circuitry 25 for introducing the data into the drum storage device 21, and timing circuits 26 controlled by recorded timing spots on the timing section of the drum.

Magnetic drum storage device

In the particular embodiment for Method 1, the drum is a cast aluminum cylindrical member closely wound with wire in a spiral manner. The wire is ground down to approximately one-half of its diameter leaving a continuous surface having excellent magnetic qualities. The drum is approximately 10 inches in diameter and the length is determined by the number of tracks desired for data storage and timing purposes. The drum is attached to a shaft which is connected to the driving means 19 (Fig. 1) and is driven at a speed of approximately 4300 R. P. M. The driving means may comprise any driving motor suitable for driving purposes and capable of driving the drum at the selected speed.

Figure 4:
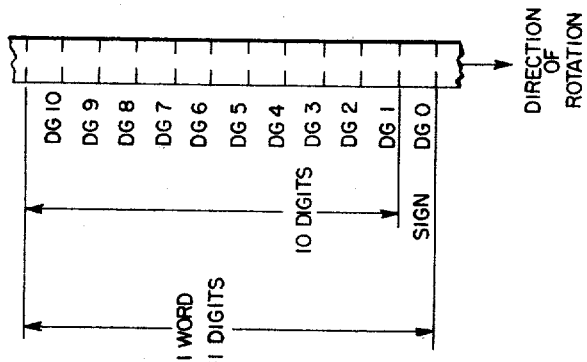
Fig. 4 is a fragmentary schematic representation of a storage track showing the arrangement of the code elements in a single digit position.
Figure 3:
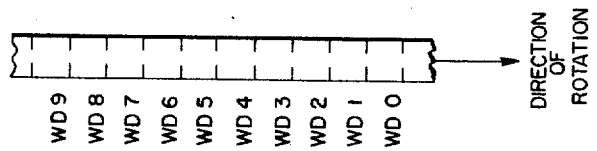
Fig. 3 is a fragmentary schematic representation of a storage track showing the arrangement of word positions.

The drum is divided into areas designated as tracks which extend circumferentially about the surface of the drum. Each track of the storage section of the drum is arranged to store one or more words up to a maximum of twenty words. Each word is composed of ten digits plus an algebraic sign, i. e., plus or minus, represented in digital form. As shown by Fig. 3, the word positions in each half of the track are respectively designated as WD–0, WD–1, WD–2 and so on, to WD–9. As shown by Fig. 4, the digit positions within each word are respectively designated as DG–0, DG–1, and so on, to DG–10. DG–10 is the position in which the algebraic sign is recorded. The system disclosed herein employs the convention of representing a negative sign by a digit "8" recorded at DG–0, while a positive sign is represented by a digit "9" recorded at DG–0.

Figure 5:
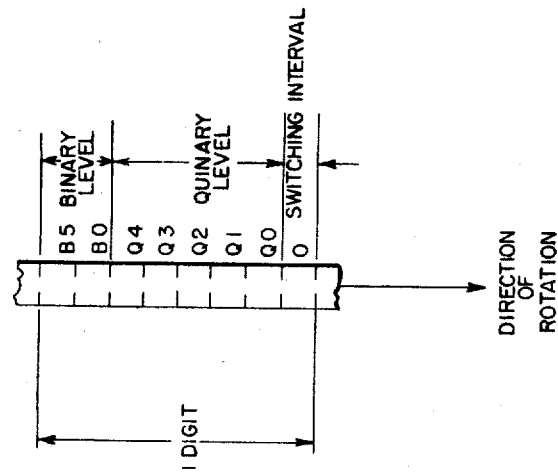
Fig. 5 is a fragmentary schematic representation of a storage track showing the arrangement of the code elements in a single digit position.

In the present system we have chosen to represent the digits in accordance with a 7-bit biquinary code. As shown in Fig. 5, each digit position is divided into eight cells, capable of being magnetized selectively. Seven of these cells are assigned to the seven bits or elements of the biquinary code, and the eighth cell designated as "0" is used to provide a switching interval between digits. The first five cells respectively pertain to the quinary bits designated as Q0, Q1, Q2, Q3 and Q4. The next two cells respectively pertain to the binary bits designated as B0 and B5. Any of the digits can be represented by selectively magnetizing one cell in the quinary level and one cell in the binary level. For example, the digit "3" is represented by magnetizing the B–0 and the Q–3 cells. The digit "7" is represented by magnetizing the B–5 and the Q–2 cells. In this manner each digit can be represented by two active cells, one in each level.

Timing

The timing section of the magnetic drum 11 is schematically indicated by Fig. 1. This section constitutes several tracks having permanently recorded spots. Each track has an associated read head. A signal is generated in the read heads as each magnetically recorded spot passes in close proximity to the read heads. These signals are used to control a plurality of timing circuits represented by the block shown at 18 (Fig. 1). The timing circuits produce various timing pulses, as shown by Figs. 6, 7, 8 and 8a, in accordance with techniques that are well known in the art. These timing pulses are cyclically supplied to the data transfer circuits for controlling various timing and switching functions, as will be described more fully hereinafter.

Figure 8:
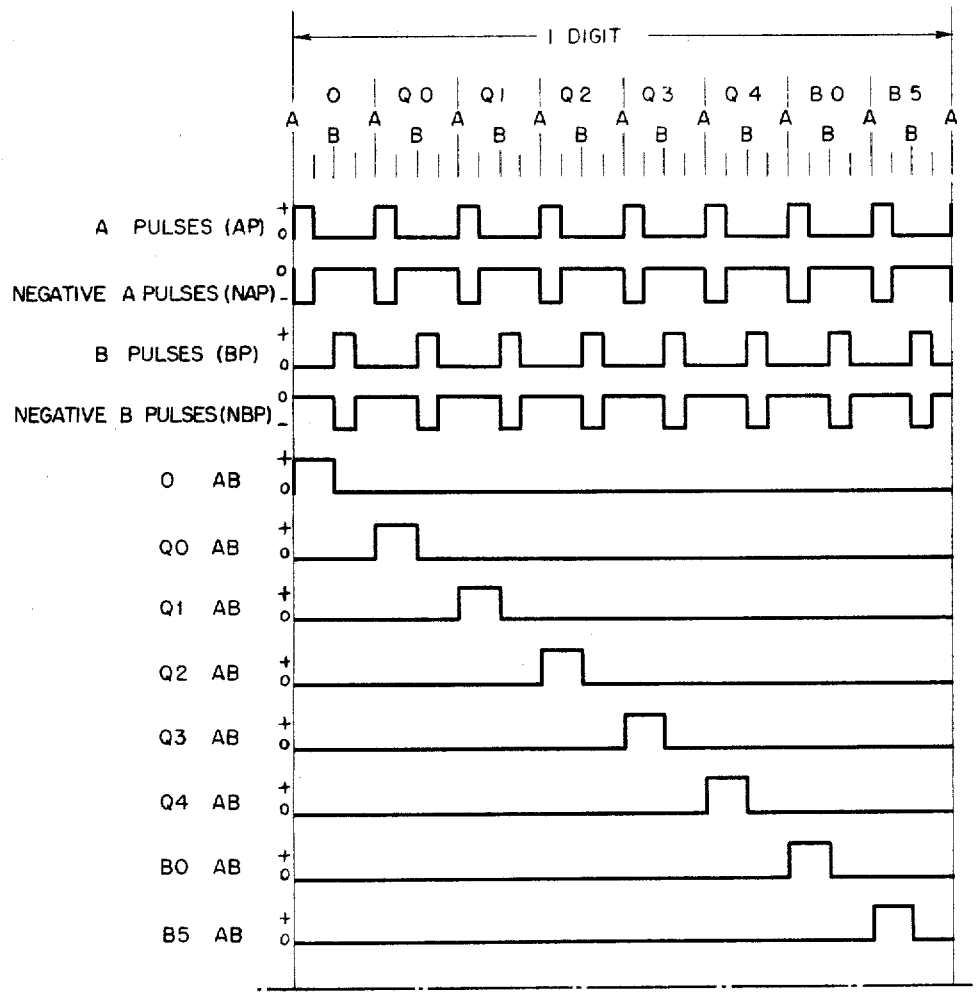

As shown by Fig. 8, each cell of the timing sequence contains what are referred to as "A" and "B" points. The "A" point occurs at the beginning of the cell and the "B" point occurs at the mid-point of the cell. "A" pulses are short timing pulses which are initiated at the "A" points. "B" pulses are short timing pulses which are initiated at the "B" points. Another type of pulse frequently used in the present system and referred to as an "AA" pulse has a duration extending from one "A" point to the succeeding "A" point. A "BB" pulse is one which has a duration extending from a "B" point to the succeeding "B" point.

Figs. 6, 7, 8 and 8a, show various timing pulses which may be employed, along with their abbreviations. For example, "AP" represents "A" pulses, and so forth. Some pulses are identified as pertaining specifically to quinary bits, binary bits, or the "0" switching points. The use and identification of the pulses will become more apparent as the description proceeds.

Card reader

Figure 9:
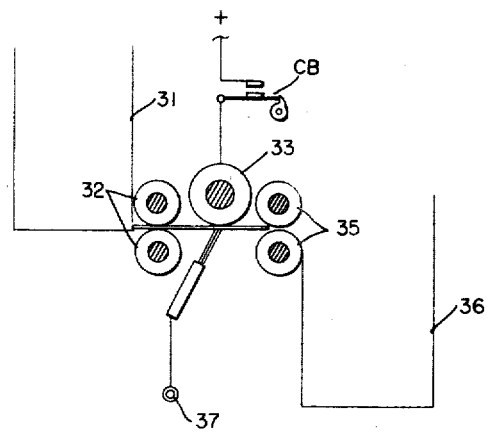
Fig. 9 is a schematic representation of a card feeding and reading arrangement.

The apparatus of the present invention comprises a record reading unit indicated in Fig. 1 by the block 10 labeled "Card Reader." The card reader unit is schematically shown in Fig. 9, and is similar in construction to the record sensing unit disclosed in Reissue Patent No. 21,133 to C. D. Lake, issued June 27, 1939. For details of construction reference may be had to Reissue Patent No. 21,133. The card reader comprises a card hopper 31 for holding a stack of record cards. The cards are fed from the bottom of the stack in the hopper 31, one at a time, by a card picker (not shown), which feeds them to the first pair of feed rollers 32. From the latter they pass between a contact roller 33 and a set of brushes 34. Beyond the contact roller the card passes between an additional pair of feed rollers 35 and into a stacker 36.

Figure 10:
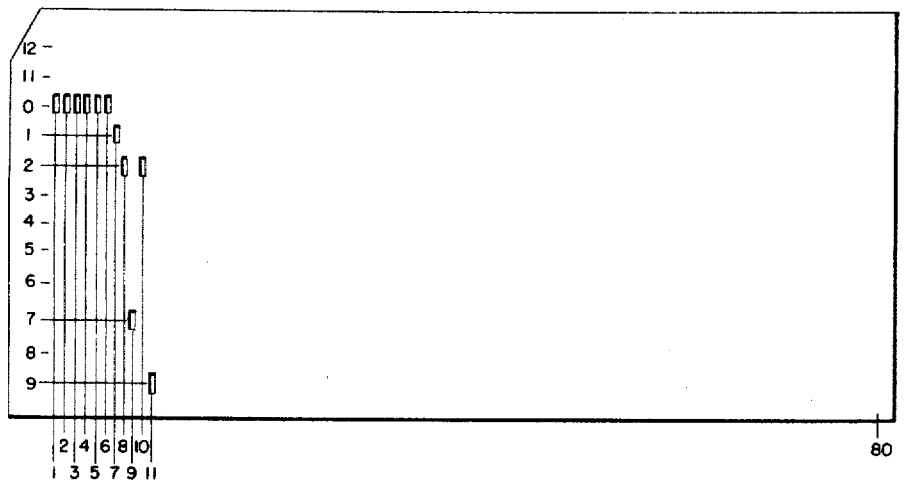
Fig. 10 shows a diagrammatic arrangement of the well-known IBM record card.

The card reader has the function of sensing cards of the type shown in Fig. 10, and to transfer electrical pulses representative of the data sensed to the tube matrix 12 (Fig. 1).

The record cards as shown in Fig. 10, are subdivided into vertical columns and horizontal rows, or index point positions. The vertical columns may be grouped into fields and within each field the different columns pertain to different denominational orders. Ten of the index point positions pertain respectively to the ten digits "0" through "9" as indicated at the left side of the card, while two index point positions, used for control purposes, are designated as the "12" and "11" index point positions. Data is recorded in the cards by punching holes in various index point positions in the different columns. A single perforation in a column in one of the "0" to "9" index positions indicates a digital value corresponding to the position; e. g., a perforation in the "4" position represents the digit "4." In the present system the cards are fed past the sensing brushes 34 face down with the 12's edge leading The reading station of the card reader comprises a common contact roll 33 connected with a constant source of potential during the interval that the card is passing the sensing brushes, as indicated by the timing diagram of Fig. 18, and a row of conductive sensing brushes 34, one for each column of the card. Each sensing brush 34 is adapted to sense a single card column and to engage through a perforation in the column with the common contact roll 33 to complete an electrical circuit.

As shown by Fig. 9, each of the sensing brushes 16 is directly connected to a plug hub 37. These plug hubs are part of a plugboard, Fig. 11. The plugboard is a component part of the card reader. It is similar in construction to the plugboard shown in U. S. Patent No. 2,111,118 to C. D. Lake, granted March 15, 1938. The plugboard provides a flexible and convenient means for making electrical connections between certain columns of the sensing means and the sequencing means. More particularly, the plug hubs provide a selective means for electrically connecting the read sensing brushes 34 with the sequencing tube matrix. The plugging will be more fully described later.

Data transfer circuits

The principal data transfer circuits are illustrated in block diagram form in Figs. 12a, 12b, 12c and 12d. Fig. 13 indicates the manner in which these views should be assembled.

Figure 14:
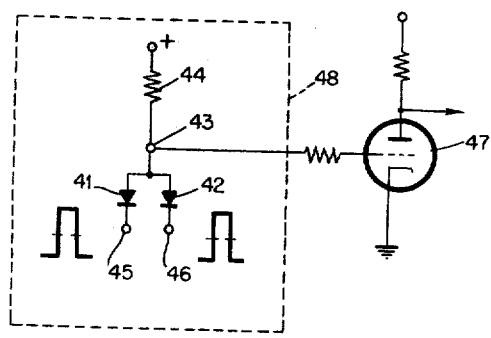
Figure 15:
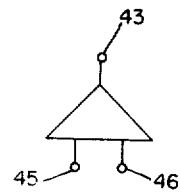

Attention will be given now to various typical forms of tube and diode circuits which are shown diagrammatically in Figs. 12a, 12b, 12c and 12d. In Fig. 14, for example, there is shown a typical coincidence switch, otherwise known as a logical "and" circuit, comprising the germanium crystal diodes 41 and 42. The common terminal 43 of the diodes 41 and 42 is connected through a voltage dropping resistor 44 to a source of positive voltage. The individual input terminals 45 and 46 of the diodes 41 and 42 are normally biased negatively so that the common terminal 43 is normally at a negative potential with respect to ground. If coincident positive pulses are applied to the terminals 45 and 46, the potential of the terminal 43 is raised. However, if only one of the terminals 45 and 46 is pulsed positively, the potential of the terminal 43 is not raised appreciably. A voltage-responsive device, such as the electron tube amplifier 47, is controlled by the potential of the terminal 43 to furnish a usable output voltage pulse whenever a coincidence of positive input pulses is detected. For simplicity, the portion of the coincidence switch shown in the broken line rectangle 48, Fig. 14, is generally represented as shown in Fig. 15.

Figure 16:
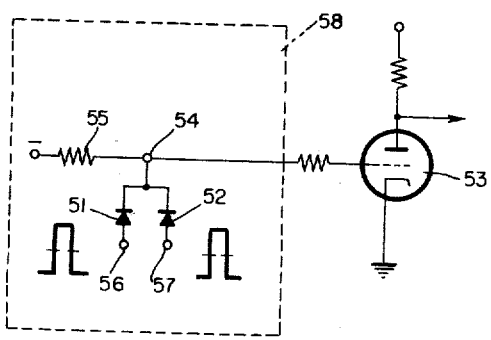
Figure 17:
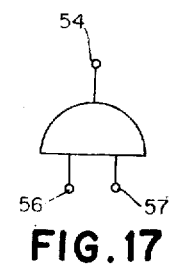

In Fig. 16, there is shown a typical mixer, otherwise known as a logical "or" circuit, comprising the diodes 51 and 52. A voltage-responsive device, represented by the electron tube amplifier 53, is controlled by the potential of the common output terminal 54 of the diodes 51 and 52, which terminal is connected by a resistor 55 to a source of negative voltage. If either one (or both) of the diode input terminals 56 and 57 is pulsed positively, the potential of the terminal 54 is raised. For convenience, the portion of the mixer circuit shown in the broken-line rectangle 58, Fig. 16, is generally represented as shown in Fig. 17.

Figure 19:
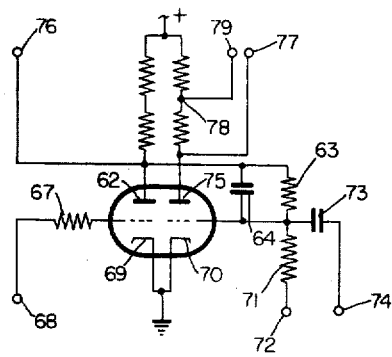

Fig. 19 shows the circuitry of a double inverter amplifier unit. This unit comprises a twin triode 61 in which the plate 62 of the first triode is coupled through a resistor 63 and capacitor 64 to the grid 65 of the second triode. The grid 66 of the first triode is connected through a resistor 67 to an input terminal 68. The cathodes 69 and 70 have a common ground connection as shown. The grid 65 is connected through a resistor 71 to a terminal 72 and is also coupled by a capacitor 73 to a terminal 74. The plates 62 and 75 of the first and second triodes, respectively, are connected to plate terminals 76 and 77. The plate circuit of the second triode also has a tap 78 connected to a plate tap terminal 79. Normally, the double inverter amplifier is biased so as to be in an "off" condition, i. e., the first triode is non-conductive and the second triode is conductive. The block symbol for the double inverter is shown in Fig. 20.

Figure 20:
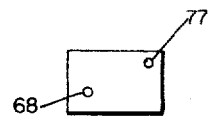

The operation of the double inverter shown in Figs. 19 and 20 is such that when a positive pulse is applied to the input terminal 68, the resulting drop of voltage at the plate 62 is coupled to the grid 65, causing a rise in voltage at the plate 75. Hence, the double inverter amplifier is triggered "on" and a positive output voltage pulse is available at the terminal 77 or 79, and a negative output pulse is available at the terminal 76.

There are several arrangements in which the double inverter amplifier shown in Figs. 19 and 20 may be used. For example, it may be triggered "on" by coincident input pulses after which it will be restored to the "off" condition. As will be explained subsequently, the double inverter amplifier is adapted for use in conjunction with a cathode follower to provide a latch unit. When used in this manner, the unit is turned "off" by a pulse from an external means.

Figure 21:
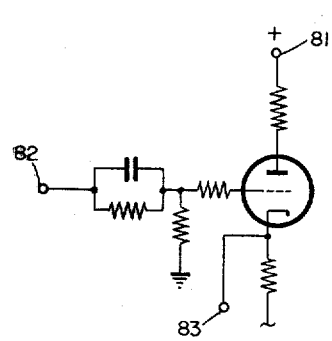
Figure 22:
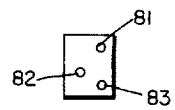

Numerous cathode followers are employed in the data transfer circuits. Fig. 21 illustrates a cathode follower unit having a plate input terminal 81, a grid input terminal 82 and a cathode output terminal 83. In some arrangements within the data transfer system the plate potential is supplied from a constant source and in other arrangements the plate potential is supplied under control of other circuitry. The cathode follower type of circuit is represented by the symbol shown in Fig. 22.

Figure 23:
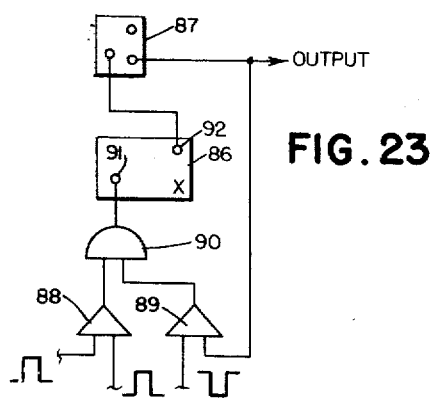
Figure 24:
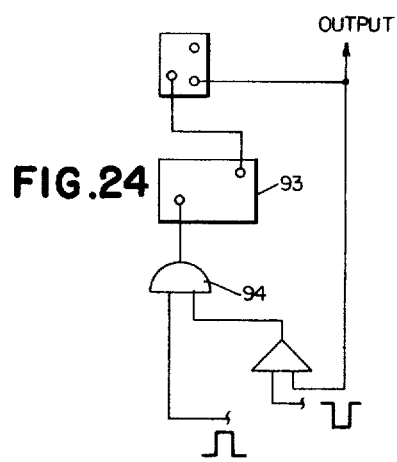

Figs. 23 and 24 show two forms of latch units that are employed in the data transfer circuits. Certain of these latch units are disclosed in the Patent 2,628,309 issued to Ernest S. Hughes, Jr. The latch unit which is illustrated in Fig. 23 uses a double inverter amplifier 86 of the type shown in Figs. 19 and 20, a cathode follower 87, two coincidence switches 88 and 89, and a mixer 90 for input and feedback purposes. In the normal "off" condition of the latch unit, the left-hand section of the amplifier 86 is non-conductive and the right-hand section is conducting, as symbolically indicated by an "X". The application of coincident positive pulses to the switch 88 causes a positive pulse to be applied at the input terminal 91 of the amplifier 86, thereby turning the amplifier "on." The positive output voltage at the terminal 92 is fed back through the cathode follower 87 to an input of switch 89. The other input to switch 89 is normally positive causing a resultant positive potential to pass through the mixer 90 to the input of the amplifier 86. This causes the latch unit to remain "on" after the termination of either or both positive pulse inputs to switch 88. The output of the latch unit is taken from the output side of the cathode follower 87. To reset the latch unit, a negative pulse is applied to the input of switch 89 thereby causing the amplifier 86 to be turned "off."

Fig. 24 illustrates a type of latch unit which is similar to the latch unit of Fig. 23 except that the amplifier 93 is turned on by a single positive pulse applied to the input of the mixer 94. The operation of the latch is otherwise identical to that described above for the latch unit of Fig. 23.

Sequencing matrix and diode switches

The purpose of the sequencing matrix and diode switches is to change electrical signals which are the result of simultaneously sensed digits into successive signals for application to a single line. As shown by Figs. 12a and 12b the tube matrix comprises ten vertical rows of triode tubes with each vertical row having eleven tubes. Each of the tube stages functions as a cathode follower type of circuit. The cathodes in each vertical row have a common connection. The plate potential for each tube in the matrix is supplied from the contact roll 33 (Fig. 9) through the respective read sensing brush 34 under control of the perforation in the record card being read. The control grids of the tubes in each horizontal row are common connected and the horizontal rows are sequentially pulsed with digit pulses, called "DG" pulses, from the top row to the bottom row for each value timing of the drum. For each half revolution of the drum the horizontal rows of tubes will be scanned from top to bottom ten times.

The tubes of the matrix are normally nonconductive. Any tube having a plate potential in coincidence with a DG timing pulse will be rendered conductive. The resulting output pulse from the cathode of a conductive tube is coupled to a switch of the diode switches 170 through 179 for the respective vertical row in which the conductive tube is located (Fig. 12b).

Figure 6:
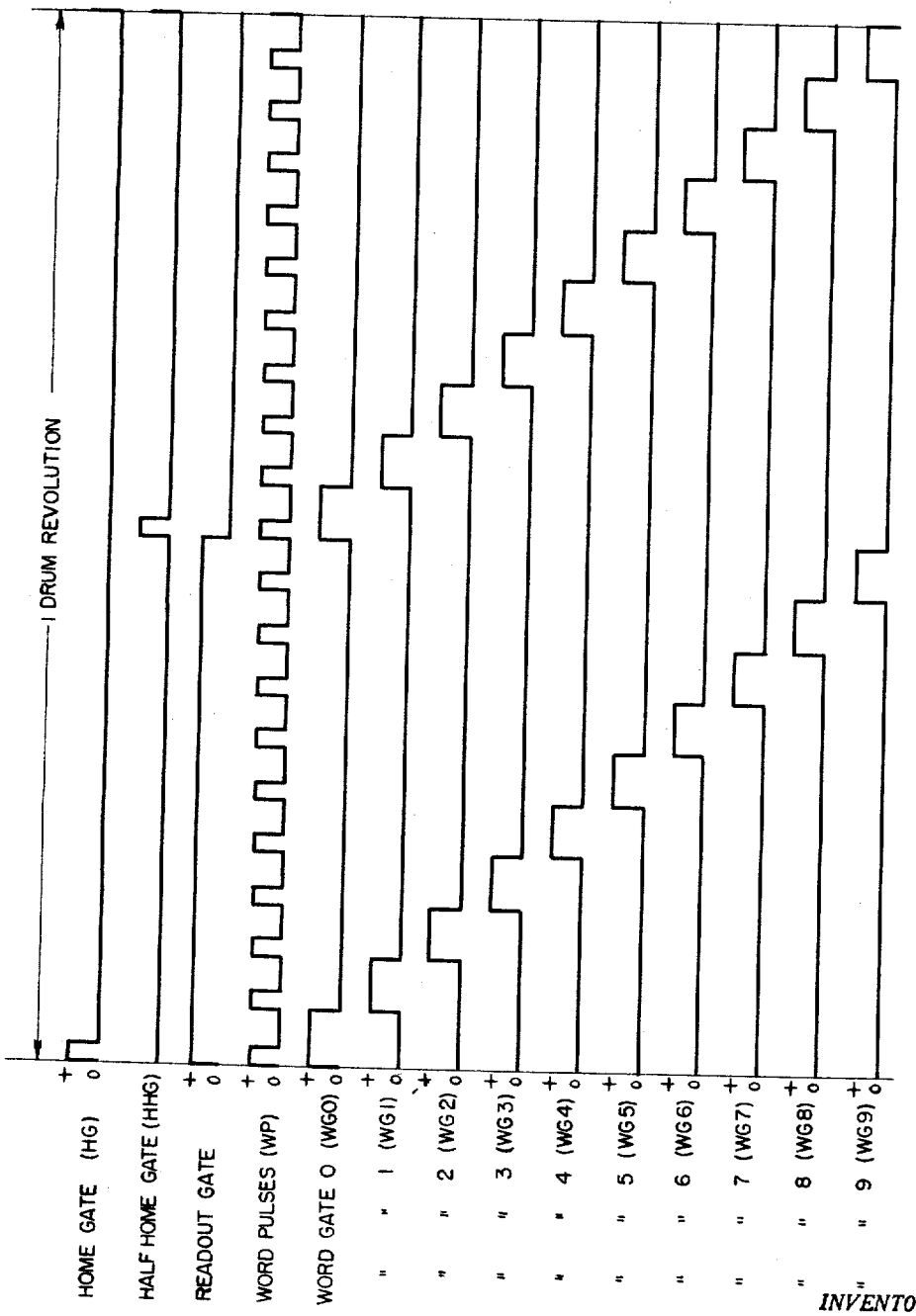
Figs. 6, 7, 8 and 8a are timing diagrams showing the various timing pulses used in the data transfer system.
Figure 7:
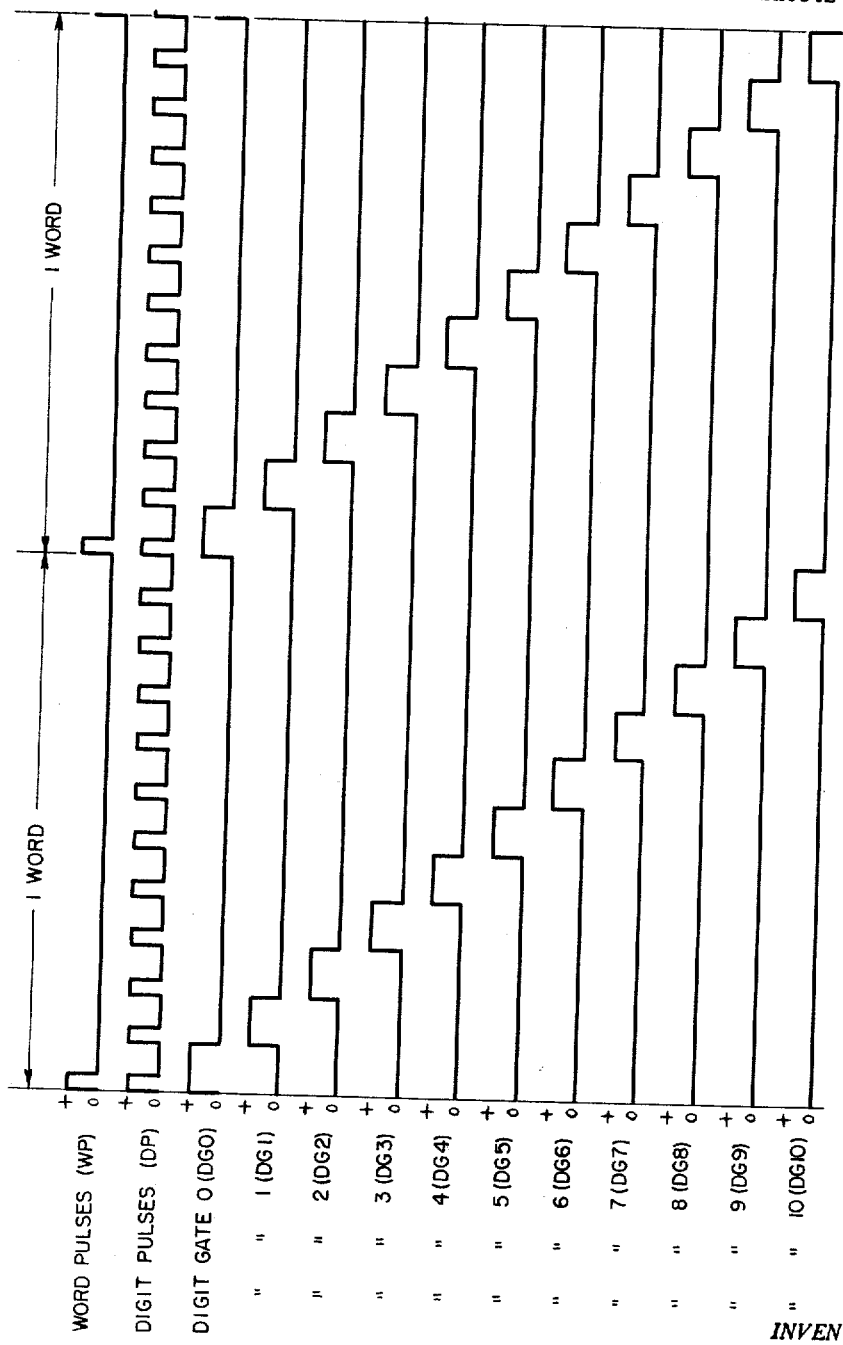

The diode switches 170 through 179 are scanned from left to right during each half revolution of the drum under the control of word gate timing pulses, called "WG" pulses. These switches can be rendered conductive only during the first half revolution of the drum under control of the readout gate (Fig. 6). There will be a resultant pulse output from the switch for each vertical row of tubes whenever there is a tube output which is coincident with the readout gate and the respective "WG" pulse. The composite pulse output from the switch for each vertical row is passed through a cathode follower stage to the input of a double inverter amplifier stage 97.

Positive pulse outputs from the double inverter amplifier stage 97, which are representative of the digital data from the record card, are passed through a cathode follower 98 to the input of a coincidence switch 99 (Fig. 12d). Herein the digital data pulses are switched with the output pulses from the translator unit to convert the digital data into biquinary code form as will be subsequently described.

To recapitulate, the magnetic drum 11 is capable of storing twenty values in a single track. In view of this fact, it may be pointed out that each vertical row of tubes in the matrix is scanned from top to bottom ten times, and the vertical rows are scanned from left to right once, during each half revolution of the magnetic drum 11. Due to the rapid rate of rotation of the magnetic drum 11, the read feed scan matrix will be scanned several times for each index position of the record card. The multiple scanning for each index position does not complicate the system but merely serves to insure that each digit is definitely sensed for the transfer of data to magnetic storage. It makes no difference where the scanning actually starts nor how many times the sequencing matrix is scanned, but at least one complete scan must be completed for each index point of the record card.

*Translator unit*

The purpose of the translator is to successively and repeatedly furnish to a single line the pulses representative of digits in biquinary form corresponding to the digits in decimal form on the card being sensed in the reading station of the card reader. The translator unit, as shown by Fig. 12c, comprises seven tubes, 100 through 106, each connected in a cathode follower type of circuit. The plate potentials for these tubes are furnished from an emitter schematically shown at 107 of Fig. 12c. The emitter is a mechanically driven commutating device, which, in the subject system, is a part of the card reader unit. Emitters of this type are frequently used in the well-known IBM accounting machines. The emitter is similar in construction to the ones shown by Fig. 48a and described in Patent No. 2,615,569 to C. D. Lake et al., issued October 28, 1952. The emitter is capable of creating transient representations in the form of differentially timed pulses, which by their timing with reference to the cycle of operation of the card reader unit, are representative of digits corresponding to the index positions as indicated by the record card shown in Fig. 10. Under control of the emitter, plate potentials are sequentially applied from the emitter segments to the tubes 100 through 106 in predetermined combinations which are in accordance with the biquinary code of the preferred system.

Figure 8A:
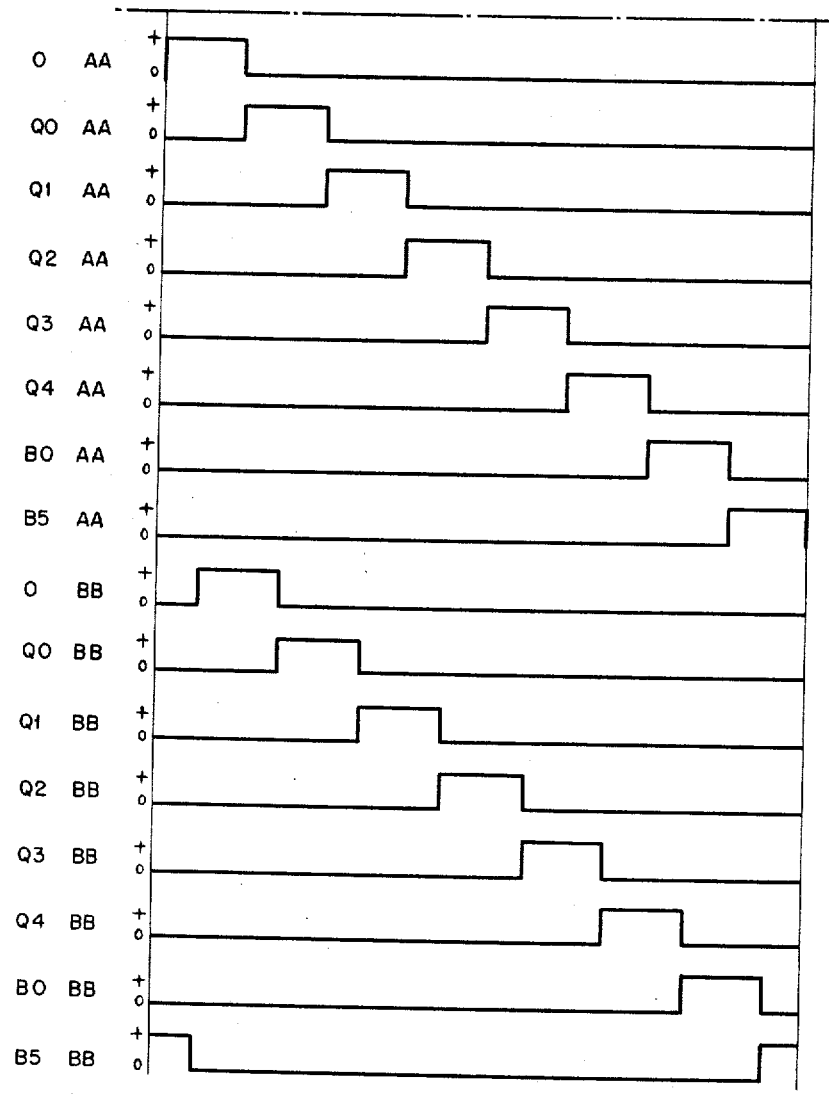

With reference to the timing diagram of Fig. 8a, the grids of the tubes 100 through 106 (Fig. 12c) are sequentially pulsed with timing pulses from the timing circuits controlled by the magnetic drum. Due to the time lost in switching the record circuits, it is necessary to scan the translator with pulses of the biquinary code which are in advance of the true biquinary representation for a particular digit. This need will become more apparent later in the description. Tubes having coincident plate and grid potentials will provide positive output pulses. The positive output pulses from the cathodes of tubes 100 through 106, which are commonly connected, are applied to the input of the coincidence switch 99 (Fig. 12d).

The inputs to switch 99 are pulses representative of digital data from the record card applied to one input terminal and pulses from the translator representative of digits in coded form applied to the other input terminal. When there is a coincidence of input pulses there will be a resultant pulse output from switch 99 which passes through the mixer 108 and cathode follower 109 and is applied to an input of switch 110. This pulse is herein switched with an "A" pulse and serves to trigger the "A" to "B" latch unit 111 "on." A positive pulse output from latch unit 111 turns the "A" to "A" latch unit 112 "on." The "A" to "A" positive pulse output of latch unit 112 is applied to an input of switch 113 wherein it is switched with a "B" pulse. The resultant positive pulse output from switch 113 is a record pulse which is passed through the double inverter amplifier 114 and cathode follower 115. The record pulse output from cathode follower 115 is coupled to one of the record heads for the three storage tracks of the magnetic drum under control of the alternation controls, now to be described.

*Alternation controls*

The alternation controls are shown schematically in Fig. 12d. Three cams 120, 121 and 122 are rigidly atteached to a shaft 123. The shaft 123 is a part of the card reader mechanism and is adapted to be driven through ⅓ of a revolution for each card feed cycle. The cams 120, 121 and 122 are attached to the shaft 123 in such a manner that they will sequentially control the contact points 124, 125 and 126, respectively. The relays 127, 128 and 129 are energized successively, one relay being energized during each card reading cycle as indicated by the electrical timing chart of Fig. 18.

Each of the relays 127, 128 and 129 has an "a" contact point and a "b" contact point which controls the circuits to the record and erase coils respectively of a combinational record-erase head. More particularly, contact point 127a controls the circuit for the record coil of head 130 and thereby controls the recording on track A of the drum storage device 11. Contact point 127b controls the erase coil of head 130 and thereby controls the erasing of track A of the drum storage device 11. Similarly, relay 128 controls the recording and erasing for track B and relay 129 controls the recording and erasing for track C of the drum storage device 11. The recording and erasing operations will become more apparent as the description proceeds.

With this system of alternation controls it is possible to store digital information from each of three separate cards transferred during three separate card feed cycles. Such a storage system is desirable in many of the digital processing operations of calculating machines in that it allows processing of data from two previously read cards concurrently with the transfer of data into magnetic storage from a third card.

*Storage tracks*

In the preferred embodiment there are three storage tracks on the drum 11 designated as tracks A, B and C (Fig. 12d). Each track is capable of storing all data read from a single record card in the reading station of the card reader during a card read cycle. The alternation controls automatically alternate the three storage tracks in such a manner that one track is conditioned to receive data from a card in the read station, while the other two tracks, which may contain data read from cards on previous read cycles could be made available to a calculator for processing concurrently with the read-in to storage of new data from the card reader. The storage track into which the new data is to be read is automatically erased after the initiation of a card feed cycle but prior to the sensing of the data in the record card. The operation will be more fully apparent as the description proceeds.

Data transfer from record cards to storage

The operation of transferring data from a record card to storage will be most easily understood by following the description of the transfer of an illustrative value from the record card. As previously stated, a value is composed of ten digits plus an algebraic sign represented in digital form. As shown by the card of Fig. 10, the punched holes in the first eleven columns of the card indicate a positive value of 0,000,001,272. The punched hole in the "9" index position of column 11 is the indication for a positive sign.

Figure 11:
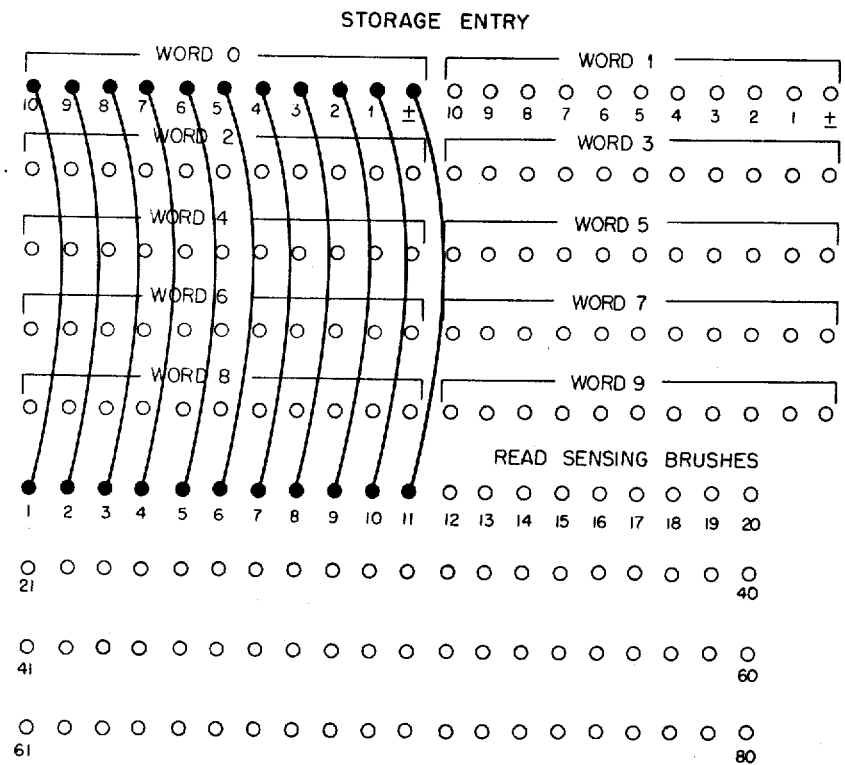
Fig. 11 is a chart diagrammatically illustrating the pluggable connections for a chosen example.

Fig. 11 is a plug chart showing the plugged arrangement for the illustrative example. The read sensing brush plug hubs for columns 1 through 11 are respectively connected to the storage entry word 0 plug hubs for digits 10 through 1 and the ± plug hub, as shown. This arrangement of pluggable wiring connects the read sensing brushes 34 (Fig. 9) with the plates of the tubes in the left-hand row of the matrix shown by Figs. 12a and 12b. The brushes 34 for columns 11 through 1 are respectively connected with the plates of the tubes 140 through 150.

Assume the record card of Fig. 10 to be placed in the hopper 31 of Fig. 9 and that a card feed cycle has been initiated. The record card will advance to the feed rolls 32 and then pass between the read sensing brushes 34 and the contact roll 33. The contact roll 33 will be connected with a constant source of potential as the card passes between brushes 34 and the contact roll 33 and at the times in the card feed cycle indicated by the timing diagram of Fig. 18.

Storage erase

During the initial portion of the card feed cycle, the storage track in which the data from the card is to be stored must be erased. For example, it may be assumed that the data from the card is to be stored in storage track A (Fig. 12d).

With reference to Figs. 18 and 12d, at the start of the card feed cycle alternation relay 127 will be energized by the closing of contact points 124. This causes the relay points 127a and 127b to be closed and remain closed throughout the card feed cycle.

A cam 151 attached to a one revolution per card feed cycle shaft of the card reader (not shown), causes the contact points 152 to be closed for a portion of the card feed cycle as indicated by the electrical timing diagram of Fig. 18. This causes a positive potential to be applied to one of the inputs to switch 153. It may be pointed out that the positive potential applied to the input to switch 153 may occur at any point with respect to the cycle of magnetic drum rotation. It is not significant that the erasure start and stop at any particular point in the drum cycle of rotation. It is only necessary that the drum make at least one revolution during the interval allowed for erasure of the track. This condition is easily fulfilled since the drum makes approximately three revolutions during each cycle point of the card reading cycle.

"B" pulses from the timing circuits controlled by the magnetic drum are applied to the second input of switch 153. The resultant pulse outputs of switch 153 are passed through a double inverter amplifier 154 and cathode follower 155. The positive pulse outputs from cathode follower 155 are coupled to the erase coil of the record-erase head 130 through the closed contact points 127b.

The successively occurring "B" pulses are applied to the erase coil of the record-erase head 130 for an interval of time controlled by the cam controlled contact points 152. Consequently each cell position on the storage track A is recorded with a spot having a definite polarity. In other words all information previously stored on the storage track A is obliterated. After one complete revolution of the magnetic drum, the repetition of erase pulses has no effect other than to insure that the track is completely erased. At 12.5 time of the card reader cycle as indicated by Fig. 18, the contact points 152 will open. This causes switch 153 to stop passing the "B" pulses.

Data sensing and transfer

As the record card advances twelve edge first, the sensing brushes 34 will first encounter all holes punched in the zero index position. The sensing brushes 34 for columns 1 through 6 will engage the contact roll 33 (Fig. 9). This will complete an electrical circuit from contact roll 33, through each of the sensing brushes 34 for columns 1 through 6 to the plates of tubes 145 through 150 in the matrix (Figs. 12a and 12b). This supplies the plate potential for the tubes.

As the grids of the vertical rows of tubes are pulsed from top to bottom with DG pulses, the DG-5 through DG-10 pulses respectively and successively applied to the grids of tubes 145 through 150 will be coincident with the plate potentials applied to the tubes. The scanning may become effective with any particular horizontal row of tubes since the drum and card reader are not mechanically synchronized. In the particular scan operations it would be well to assume the scanning to start with the top row of tubes and progress to the bottom row of tubes. Tube 145 will be the first tube to be rendered conductive as a result of the coincident DG-5 pulse and plate potential.

The resultant positive pulse output from the cathode of tube 145 is applied to an input of switch 170. Assuming the scanning of the horizontal row of switches by "WG" pulses to begin at the left and proceed to the right. The input to switch 170 from tube 145 is coincident with the WG-0 pulse applied to switch 170. A pulse will be passed through the switch 170, the cathode follower 161, and the double inverter amplifier 97. The output from the amplifier 97 is passed through the cathode follower 98 and applied to the switch 99. The pulse applied to switch 99 is representative of the zero digit in decimal form as read from column six of the record card.

Since the record card in the read feed of the card reader unit is first sensed in the "0" index position, the emitter 107 (Fig. 12c) will cause a positive potential to be applied from the "0" segment to tubes 100 and 105 of the translator. As previously mentioned, the translator tubes 100 through 106 are scanned with pulses of the biquinary code during each DG time. A "0BB" pulse applied to the grid of tube 100 will be in coincidence with the plate potential supplied by the emitter 107. The result will be a positive output pulse from the cathode of tube 100 which is connected to the input of switch 99. During the same DG time a "Q4BB" pulse applied to the grid of tube 105 will be in coincidence with the plate potential supplied by the emitter 107. The result will be a positive output pulse from the cathode of tube 105 which is also connected to the input of switch 99. Consequently, both "0BB" and "Q4BB" pulses are successively applied to the switch 99 during DG-5 time. These pulses are representative of a zero digit from the translator. The mention of "0BB" and "Q4BB" pulses as being representative of a zero digit in biquinary code form is contradictory to the explanation of the biquinary code previously given. It is necessary to scan the translator with biquinary code pulses in advance of the true coded pulses to offset the time lost in switching the record circuits. This action permits the pulses to be recorded on the drum storage tracks as on-time pulses, which will become evident as the description proceeds.

Summarizing the above, a DG-5 positive gate pulse is applied to switch 99 in coincidence with positive "OBB" and "Q4BB" pulses from the translator.

The resultant "OBB" and "Q4BB" output pulses from switch 99 are sequentially passed through the mixer 108 and cathode follower 109 to the input of switch 110. Herein the "OBB" and "Q4BB" pulses are switched with "A" pulses which come from the timing circuits and occur at the "Q0" and "B0" time of DG-5. The resultant outputs from switch 110 are "Q0A" and "B0A" pulses each of which, on its occurrence, is used to turn the "A" to "B" latch unit 111 "on" during DG-5 time. This latch unit is similar to the latch unit illustrated in Fig. 23 and previously described.

On each occasion that the latch unit 111 is turned "on," a positive voltage output from the cathode follower 165 is applied to an input of switch 166. The other input to switch 166 is supplied with negative "B" pulses (NBP) from the timing circuits. The coincidence of positive potentials at the inputs to switch 166 causes the "A" to "B" latch unit to remain "on" during the interval between the incoming "A" time and the succeeding "B" time. Application of the negative "B" pulse (NBP) to the input of switch 166 destroys the coincidence of positive potentials, thereby causing latch unit 111 to turn "off."

The positive output potential furnished by the "A" to "B" latch unit 111 is applied through the mixer 167 causing the "A" to "A" latch unit 112 to be turned "on." The positive output voltage of latch unit 112 from the cathode follower 168 is coupled to the input of coincidence switches 169 and 113. A negative "A" pulse (NAP) signal is applied to switch 169 so that normally there is a coincidence of positive voltages when the latch unit 112 is "on." This serves to keep the latch unit 112 in its "on" condition until the succeeding negative "A" pulse occurs, whereupon the coincidence is destroyed and latch unit 112 is turned "off." The latch unit 112 meanwhile has been "on" for one "A" to "A" period. Thus, the "Q0A" and "B0A" input signals to the "A" to "B" signal latch 111 have been converted to "Q0AA" and "B0AA" pulses as depicted in the timing chart, Fig. 8a.

The positive output voltages representative of "Q0AA" and "B0AA" pulses are applied to the switch 113. Herein the pulses are switched with "B" pulses to form "Q0B" and "B0B" pulses for recording purposes. The "Q0B" and "B0B" output pulses from switch 113 are passed through a double inverter amplifier 114 and cathode follower 115. The positive pulse outputs from the cathode follower 115 are passed through the relay contact points 127a, which are closed as a result of the alternation controls previously described, to the record coil of the erase-record head 130 for storage track A. The positive current pulses applied to the record coil produce a magnetic spot having an opposite polarity to that of the spots produced by the erase pulses, as previously described. As a result of the above-described record operation, the "Q0" and "B0" cells of the DG-5 position are magnetically recorded with significant markings. Thus, the "0" from column 6 of the record card is magnetically stored on the storage track A of the magnetic drum. In the same manner as described above, the "0" in each of the columns 5 through 1 of the record card will be serially stored in the "Q0" and "B0" cell positions for each of the DG-6 through DG-10 digital positions of WD-0.

As the record card of Fig. 10 continues to move in the reading station of the card reader unit, the "1" index position of the card will be sensed by the read sensing brushes 34. In the specific example shown by the record card of Fig. 10, a "1" will be sensed in column 7. The read sensing brush 34 for column 7 furnishes a plate potential to tube 144 of the read scan matrix (Fig. 12a). As the matrix is scanned from top to bottom and from left to right, the DG-4 pulse applied to the grid of tube 144 will cause tube 144 to become conductive. The resultant positive voltage output from the cathode of tube 144 is applied to the input of switch 170. This pulse will be coincident with a WG-0 pulse. The output from switch 170 is passed through the cathode follower 161, the double inverter amplifier 97, the cathode follower 98 to the input of switch 99. This input to switch 99 is representative of a "1" digit in decimal form and will be switched with the output pulses from the translator.

The plate potential from the "1" segment of emitter 107 is furnished to the plates of tubes 101 and 105 of the translator. The coincidence of "Q0BB" and "Q4BB" pulses with the plate potentials will cause resultant "Q0BB" and "Q4BB" positive output pulses which are applied to the input of switch 99. The resultant "Q0BB" and "Q4BB" output pulses from switch 99 are serially passed through mixer 108 and cathode follower 109 to the input of switch 110. Herein the "Q0BB" and "Q4BB" pulses are switched with "A" pulses. The outputs from switch 110 are "Q1A" and "B0A" pulses which serve to turn the "A" to 'B" latch unit 111 "on." The positive voltage output turns "on" the "A" to "A" latch unit 112, as described above. The output pulses from the "A" to "A" latch unit 112 are "Q1AA" and "B0AA" pulses which are applied to the input of switch 113.

In the switch 113 of the "Q1AA" and "B0AA" pulses are switched with "B" pulses and become "Q1B" and "B0B" pulses for recording purposes in storage track A. The outputs of switch 113 are passed through the double inverter amplifier 114, the cathode follower 115, the closed contact points 127a to record coil of the erase-record head 130. The "Q1B" and "B0B" pulses serve to serially magnetize the "Q1" and "B0" cells of the DG-4 position of WD-0.

As the record card of Fig. 10 is advanced in the reading station of the card reader unit, the "2" digit in columns 10 and 8, respectively, will be sensed and the "Q2" and "B0" cells of the DG-1 and DG-3 positions of WD-0 will be serially magnetized to store the digits "2." The procedure is the same as described above. As the record card continues to advance there will be no further storing until the read sense brushes 34 sense the "7" digit in column 9. At this time the "Q2" and "B5" cells of the DG-2 position of WD-0 will be serially magnetized to store a "7." Similarly, the "9" of column 11 will be stored when the "Q4" and "B5" cells of the DG-0 position of WD-0 are serially magnetized. The "9" in the DG-0 position is significant of a positive sign for the value represented in the columns 1 through 10 of the record card.

In summarizing the transfer of data from a record card to storage, the transfer of data involves the interspersion of the magnetic recordings during successive cycles of the storage device. The data is recorded on the storage track as it is read from the record card. During the sensing of a particular index point on the record card, all of the characters of that index point are read out; e. g., on sensing the zero index position, all zeroes in the card are read out in sequence from right to left within each value. The order in which the values are read out is dependent upon the selective plugging of the plugboard.

*Method 2*

Method 2, as shown schematically by Fig. 2, provides an alternate method of storing data on a magnetic drum storage device. More particularly this method relates to a parallel-by-bit and serial-by-digit method of introducing data into magnetic drum storage.

In the particular embodiment for Method 2, the drum is divided into areas designated as tracks which extend circumferentially about the surface of the drum. Since the entry of a digit is parallel-by-bit, a band of seven tracks is used to accommodate the 7-bit biquinary code. The tracks of the band are respectively designated as the "B5," "B0," "Q4," "Q3," "Q2," "Q1" and "Q0" tracks, as shown by Fig. 27. It is to be understood that this band in effect may be considered as a single track in order that coded data for a character designation may be recorded in accordance with the parallel-by-bit and serial-by-digit principles. Each band is arranged to store up to a maximum of fifty words. Accordingly, the band is divided into five sectors, as shown by Fig. 27. The sectors are designated S–0, S–1, S–2, S–3 and S–4. Each sector is capable of storing a maximum of ten words. As shown by Fig. 25, the word positions in each sector of the band are respectively designated as WD–0, WD–1, WD–2 and so on, to WD–9. Each word is composed of ten digits plus an algebraic sign, represented in digital form. As shown by Fig. 26, each word position is divided into twelve digit positions. The digit positions within each word are respectively designated as 0, DG–0, DG–1, and so on, to DG–10. The "0" position is used to provide a switching interval. DG–0 is the position in which the algebraic sign is recorded.

The apparatus for Method 2, as shown by Fig. 2, comprises a card reader 20 for sensing the record card, a magnetic drum storage device 21 for storing data sensed in the card reader 20, a tube matrix 22 and diode switches 23 for sequencing data sensed in the card reader, a translator 24 for converting the sensed data into coded form, record circuitry 25 for introducing the data into the drum storage device 21, and timing circuits 26 controlled by timing spots on the timing section of the drum 21. The card reader 20, the tube matrix 22 and diode switches 23 are identical with the apparatus as used for Method 1. The drum storage device 21, the translator 24, and the record circuitry 25 and the timing circuits 26 are modified in Method 2 to accommodate the parallel entry of bits into the drum storage device, as will be explained more fully hereinafter.

The timing circuits produce various timing pulses, as shown by Figs. 29, 30 and 31, in accordance with techniques that are well known. These timing pulses are cyclically supplied to the data transfer circuits for controlling various timing and switching functions.

Data transfer from record cards to storage (Method 2)

The data transfer circuits for Method 2 are illustrated in block diagram form in Figs. 32a, 32b and 32c. Fig. 28 indicates the manner in which these views should be assembled.

The operation of transferring data from a record card will be most easily understood by following the description of the transfer of an illustrative value from the record card. The same value that was used in the description for Method 1 may be used herein. This was a positive value of 0,000,001,272, as shown by the card of Fig. 10. It will now be shown how this value is entered into the WD–0 position of sector zero (S–0).

Fig. 11 is a plug chart which shows the plugged arrangement for the illustrative example. The read sensing brush plug hubs for columns 1 through 11 are respectively connected to the storage entry word 0 plug hubs for digits 10 through 1 and the ± plug hub, as shown. This arrangement of pluggable wiring connects the read sensing brushes 34 (Fig. 9) for columns 11 through 1 with the plates of the tubes 200 through 210 respectively (Figs. 32a and 32b).

Assuming the record card of Fig. 10 to be placed in the hopper 31 of Fig. 9 and that a card feed cycle has been initiated, the record card will advance to the feed rolls 32 and then pass between the read sensing brushes 34 and the contact roll 33. The contact roll 33 will be connected with a constant source of potential during the interval that the card is being passed by the sensing brushes 34, as indicated by the electrical timing diagram of Fig. 18.

Storage erase

During the initial portion of the card feed cycle, the S–0 portion of the drum storage device in which the data from the card is to be stored must be erased. With reference to Fig. 32c, a cam 211, attached to a one revolution per card feed cycle shaft of the card reader (not shown), causes the contact points 212 to be closed from 14.5 time of the card feed until 12.5 time, as indicated by the electrical timing diagram of Fig. 18. This causes a positive potential to be applied to one of the inputs to switch 213.

"B" pulses (Fig. 31) from the timing circuits controlled by the magnetic drum are applied to another input of switch 213. SG–0 pulses (Fig. 29) are applied to still another input of switch 213. When the inputs to switch 213 are coincident there is a resultant output which is effectively a "B" pulse. The "B" pulse outputs of switch 213 are passed through a cathode follower 214 and applied to the erase coils of the record-erase heads 215. The successively occurring erase pulses are applied to the erase coils during the SG–0 portion of each drum revolution for an interval of time controlled by the contact points 212. Consequently each cell position in the SG–0 portion of all seven tracks of the storage device are recorded with a magnetic spot of definite polarity. In other words all information previously stored in this section is obliterated. After one complete revolution of the drum storage device, the repetition of erase pulses merely insures a complete erasure of the seven tracks. At 12.5 time of the card reader cycle the contact points 212 will open. This causes switch 213 to stop passing the erase pulses.

Data sensing and transfer

As the record card advances twelve edge first in the card reader, the sensing brushes will sense the holes in the record card in the same manner as described above for Method 1. The sensing brushes will first sense the holes in the zero index position of columns 1 through 6 of the record card. This will furnish plate potential to the plates of tubes 205 through 210 in the matrix (Figs. 32a and 32b).

The matrix is scanned from top to bottom with DG pulses in the same manner as described above for Method 1. As the DG–5 through DG–10 pulses are respectively and successively applied to the grids of tubes 205 through 210 they will be coincident with the plate potentials applied to the tubes. The outputs of tubes 205 through 210 are successively applied to an input of switch 216. The switches 216 through 225 are scanned from left to right with WG pulses, as indicated by Fig. 32b and in accordance with the timing shown by Fig. 30.

The successively occurring outputs from tubes 205 through 210 when in coincidence with the WG–0 pulse applied to switch 216 will cause resultant DG pulse outputs from switch 216. The outputs from switch 216 are passed through the mixer 230, the cathode follower 231, the double inverter amplifier 232, the cathode follower 233 and are applied to the parallel connected grids of tubes 234 through 240 in the translator (Fig. 32c). The DG–5 through DG–10 pulses successively applied to all of the grids of tubes 234 through 240 are representative of the "0" digits in columns 6 through 1 respectively of the record card.

Herein there is a difference in the translator for Method 2 as opposed to the translator for Method 1, in that all of the grids of the tubes 234 through 240 are pulsed simultaneously with each pulse from the sequencing matrix rather than pulsing the grids of the tubes with bit timing pulses from the timing circuit successively, as described above for Method 1.

Since the record card in the card reader is in the "0" index position, the emitter 241 (Fig. 32c) will cause a positive potential to be applied from the "0" segment to the plates of tubes 234 and 239 during the interval that the sensing brushes are sensing the "0" index position. On each occasion that the successively occurring DG-5 through DG-10 pulses are applied to the grids of tubes 205 through 210 there will be a coincidence of plate and grid potentials in tubes 234 and 239. This will cause resultant DG-5 through DG-10 output pulses from tubes 234 and 239 which are applied to an input of switches 251 and 246 respectively. The switches 245 through 251 are supplied with "B" pulses and SG-0 pulses from the timing circuits controlled by the drum storage device.

On each occasion that the outputs from tubes 234 and 239 are coincident with the "B" pulses and SG-0 timing pulses there will be a resultant "B" pulse output from the switches 251 and 246. The output from switch 251 is passed through the cathode follower 258 and applied to the record coil of the record-erase head 215 for track "Q0." This is a positive pulse which produces a magnetic spot having an opposite polarity to that produced by the previously described erase pulses. The resultant "B" record pulse from switch 258 for the DG-5 digit pulse will cause the magnetic spot to be recorded in the DG-5 position of WD-0 on track "Q0." Simultaneously, the resultant "B" record pulse from switch 246 will pass through cathode follower 253 and cause a spot to be recorded in the DG-5 position of WD-0 on track "B0." As a result of this record operation, the "Q0" and "B0" tracks for the DG-5 position are recorded with significant markings which are representative of the "0" digit from column 6 of the record card.

In the same manner as described above, the DG-6 through DG-10 positions of WD-0 will be successively recorded with spots representative of the "0" digits for columns 5 through 1 respectively of the record card.

When the record card has advanced to the "1" index position, the "1" in column 4 will be sensed and spots will be magnetically recorded in the "B0" and "Q1" tracks for the DG-4 position of WD-0 on a subsequent drum cycle. The recording for the "1" digit will occur in the same manner as described above for the "0" digits.

When the record card has advanced to the "2" index position, the "2" in columns 1 and 3 will be sensed and successively recorded on the "B0" and "Q2" tracks in the DG-1 and DG-3 positions for WD-0. As the card continues to advance the "7" in column 2 of the record card will be sensed and spots will be recorded on the "B5" and "Q2" tracks in the DG-2 position of WD-0. In the same manner the "9" in column 1 of the record card, representative of the plus sign for the value, will be sensed and recorded in "B5" and "Q4" tracks in the DG-0 position of WD-0.

In summarizing the transfer of data from the record card to magnetic drum storage for Method 2, the transfer of data involves the parallel entry of the bit recordings for each digit. Digital recordings are made in a serial manner. Data is recorded on the storage tracks as it is read from the record card. During the sensing of a particular index point on the record card, all of the characters of that index point are read out; e. g., on sensing the "0" index position, all zeroes in the card are read out in sequence within each value. The order in which values are read from the record card is dependent upon the selective plugging of the plugboard. Like characters are recorded during the same drum cycle. Different characters are recorded during different drum cycles.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for transferring multi-character data from static storage means to a cyclically movable magnetic storage device; means for reading the stored characters out of the static storage means, said preceding means including means to sequence the readout so that each different kind of character is read out during a different cycle of said magnetic storage device and so that the readout of individual characters of the same kind occurs during a single cycle of said magnetic storage device in a prescribed order depending upon the position of the character in said static storage means, and means controlled by said readout means to record the characters on said magnetic storage device as they are read out, the timing of the readout of the characters within the cycle time of said magnetic storage device being different for each character position of said static storage means.

2. A data transfer system comprising a cyclically movable member having a magnetizable surface, a track on said member extending in the direction of movement of said member, said track containing a series of consecutive character positions, magnetic recording means associated with said track for selectively magnetizing said character positions, means for feeding a source record having data represented by designations in different character positions, each different kind of character being represented by a different designation; means for reading data stored in said source record and operative to emit signals at different time-spaced intervals corresponding, respectively, to the different kinds of characters which may be represented by said designations; means to sequence the readout of data so that the designations representing different kinds of characters are read out during respective cycles of said cyclically movable member and so that the readout of like characters occurs during a single cycle of said member, a second means to sequence the readout of the character positions so that each is read out when a different character position of said member is opposite said magnetic recording means; and data transfer means operatively connecting said second sequencing means to said magnetic recording means to record character designations in the character positions of said member as they are read out of said record.

3. A system as in claim 2 including means for selectively connecting said readout means with said second sequencing means for transposing the order of readout of characters from said source record.

4. A system as in claim 2 including resetting means for clearing said track prior to the transfer of data.

5. A data transfer system comprising a cyclically movable member having a magnetizable surface, a track on said member extending in the direction of movement of said member, said track containing a series of consecutive character positions, magnetic recording means associated with said track for selectively magnetizing said character positions according to a first code system, means for feeding a source record having data represented by designations in different character positions, each different kind of character being represented by a different designation according to a second code system; means for reading data stored in said source record and operative to emit signals at different time-spaced intervals corresponding, respectively, to the different kinds of characters which may be represented by said designations; means to sequence the readout of data so that the designations representing different kinds of characters are read out during respective cycles of said cyclically movable member and so that the readout of like characters occurs during a single cycle of said member; a second means to sequence the readout of the character positions so that each is read out when a different character position of said member is opposite said magnetic recording means; conversion means controlled by said source reading means and said second sequencing means and operative to emit recording signals according to said first code system; and data transfer means operatively connecting said conversion means and said second sequencing means to said magnetic recording means to record character designations in the character positions of said member according to said first code system as they are read out of said record.

6. A data transfer system comprising a cyclically movable member having a magnetizable surface, timing means controlled by said cyclically movable member serving to produce a cyclically occurring pattern of timing signals, a track on said member extending in the direction of movement of said member, said track containing a series of consecutive character positions, magnetic recording means associated with said track for selectively magnetizing said character positions according to a first code system, means for feeding a source record having data represented by designations in different character positions, each different kind of character being represented by a different designation according to a second code system; means for reading data stored in said source record and operative to emit signals at different time-spaced intervals corresponding, respectively, to the different kinds of characters which may be represented by said designations; means to sequence the readout of data controlled conjointly by said source record feeding means and said timing signals so that the designations representing different kinds of characters are read out during respective cycles of said cyclically movable member and so that the readout of like characters occurs during a single cycle of said member, said second sequencing means including conversion means controlled conjointly by said source reading means and said timing signals and operative to emit signals according to said first code system; a second means to sequence the readout of the character positions of the record controlled conjointly by the character representing signals from said data reading means and said timing signals so that each character position is read out when a different character position of said member is opposite said magnetic recording means; and data transfer means operatively connecting said first sequencing means and said second sequencing means to said magnetic recording means to record character designations in the character positions of said member according to said first code as they are read out of said record.

7. A data transfer system comprising a cyclically movable member having a magnetizable surface, a plurality of tracks on said member extending in the direction of movement of said member, one track assigned to each element of a first code, each track having a series of consecutive locations for storing an element of a character, magnetic recording means associated with each of said tracks for selectively magnetizing said locations; means for feeding a source record having data represented by designations in different character positions, each different kind of character being represented by a different designation according to a second code system; means for reading data stored in said source record and operative to emit signals at different time-spaced intervals corresponding, respectively, to the different kind of characters which may be represented by said designations; means to sequence the readout of the character positions so that each is read out when a different character position of said member is opposite said magnetic recording means; a second means to sequence the readout of data so that the designations representing different kinds of characters are read out during respective cycles of said cyclically movable member and so that the readout of like characters occurs during a single cycle of said member, and including conversion means controlled conjointly by said source record reading means and said second sequencing means and operative to selectively emit a combination of recording signals representing each character in said source record according to said first code system, means for coupling said recording signals to the recording means for said tracks on said member so that the signals for each character according to said first code are simultaneously stored on its respective track.

8. A system as in claim 7 including resetting means for clearing said tracks prior to the transfer of data.

9. A data storage apparatus comprising a cyclically movable member having a magnetizable surface, a band including a plurality of tracks on said member extending in the direction of movement of said member, said band containing a series of consecutive character storing positions, magnetic recording means associated with said band for asynchronously storing data in said character storing positions, a data source, means for reading characters out of said data source, and means connecting said reading means with said magnetic recording means, said connecting means including means to sequence the readout of data from said data source so that the timed sequence of recording in said character storing positions is a function of the character significance.

10. A data transfer system comprising a cyclically movable member having a magnetizable surface, a band comprising a plurality of tracks on said member extending in the direction of movement of said member, said band containing a series of consecutive character positions, magnetic recording means associated with said band for selectively magnetizing said character positions, means for feeding a source record having data represented by designations in different character positions, each different kind of character being represented by a different designation; means for reading data stored in said source record and operative to emit signals at different time-spaced intervals corresponding, respectively, to the different kinds of characters which may be represented by said designations; means to sequence the readout of data so that the designations representing different kinds of characters are read out during respective cycles of said cyclically movable member and so that the readout of like characters occurs during a single cycle of said member, a second means to sequence the readout of the character positions so that each is read out when a different character position of said member is opposite said magnetic recording means; and data transfer means operatively connecting said second sequencing means to said magnetic recording means to record character designations in the character positions of said member as they are read out of said record.

11. A data storage apparatus comprising a data source, means for reading characters out of said data source, a cyclically movable member having a magnetizable surface, a track on said member extending in the direction of movement of said member, said track containing a series of consecutive character storing positions, magnetic recording means associated with said track, and means connecting said reading means with said magnetic recording means, said connecting means including means to sequence the read out of data from said data source for asynchronously storing data in said character storing positions wherein the timed sequence of recording therein is a function of the character significance.

References Cited in the file of this patent

UNITED STATES PATENTS 2,540,654   Cohen et al. _____ Feb. 6, 1951